(12) United States Patent
DeMeritt et al.

(10) Patent No.: US 8,891,926 B2
(45) Date of Patent: Nov. 18, 2014

(54) METHODS OF REDUCING AND/OR AVOIDING FIBER ORDERING IN A CONNECTORIZED MULTI-FIBER, FIBER OPTIC CABLE SYSTEM, AND RELATED FIBER OPTIC CABLES AND ASSEMBLIES

(75) Inventors: Jeffery A. DeMeritt, Painted Post, NY (US); Micah C. Isenhour, Lincolnton, NC (US); Dennis M. Knecht, Hickory, NC (US); James P. Luther, Hickory, NC (US); James S. Sutherland, Corning, NY (US)

(73) Assignee: Corning Cable Systems LLC, Hickory, NC (US)

( * ) Notice: Subject to any disclaimer, the term of this patent is extended or adjusted under 35 U.S.C. 154(b) by 514 days.

(21) Appl. No.: 13/330,072

(22) Filed: Dec. 19, 2011

(65) Prior Publication Data

US 2013/0156377 A1    Jun. 20, 2013

(51) Int. Cl.
*G02B 6/00*  (2006.01)
(52) U.S. Cl.
USPC .......................................... 385/134

(58) Field of Classification Search
None
See application file for complete search history.

(56) References Cited

U.S. PATENT DOCUMENTS

2003/0091297 A1*  5/2003  Hung et al. .................... 385/83

\* cited by examiner

*Primary Examiner* — Uyen Chau N Le
*Assistant Examiner* — Hoang Tran

(57) ABSTRACT

Methods of reducing and/or avoiding fiber ordering during preparations of a multi-fiber, fiber optic cable to provide a connectorized multi-fiber, fiber optic cable system, and related fiber optic cables and assemblies are also disclosed. The embodiments disclosed herein allow for a section of a multi-fiber, fiber optic cable to be prepared to form two or more connectorized fiber optic cables as part of a multi-fiber cable system without requiring specific fiber ordering in the fiber optic connectors. The natural ordering of the optical fibers in the fiber optic cable is fixed in place in at least one section of the fiber optic cable before the optical fibers are cut to form adjacent fiber optic connectors in the cable system. Thus, the fiber ordering between adjacent fiber optic connectors in the cable system will be the same even though the fiber ordering of the optical fibers was random during cable preparations.

20 Claims, 19 Drawing Sheets

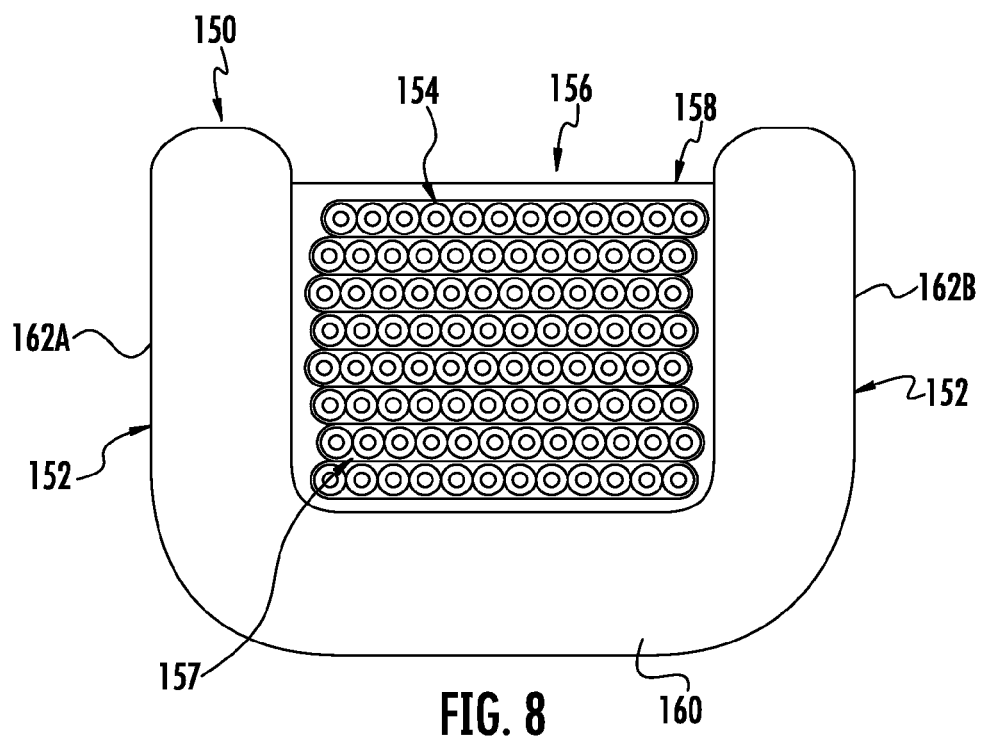

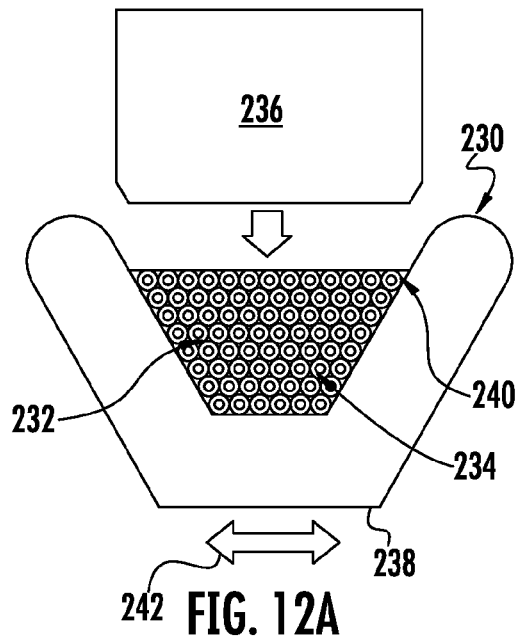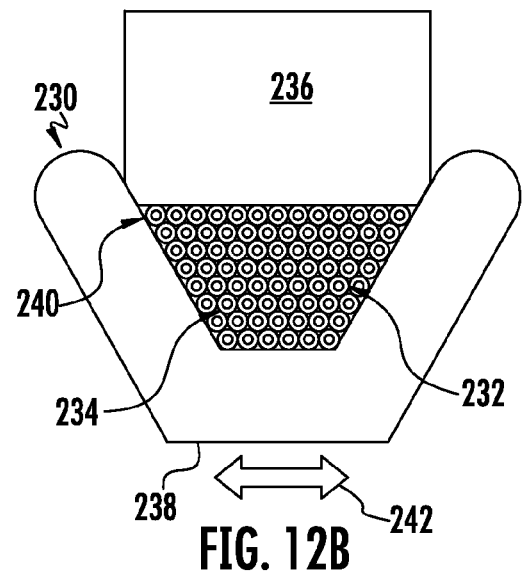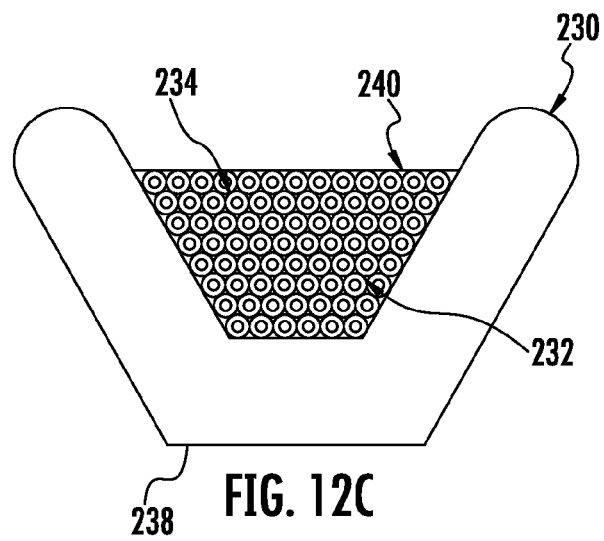

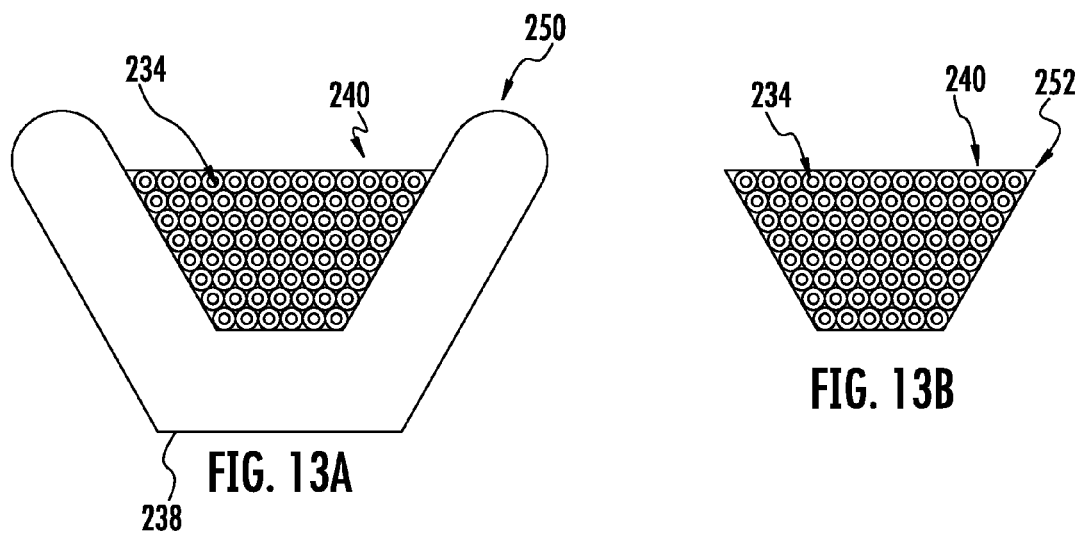

METHODS OF REDUCING AND/OR AVOIDING FIBER ORDERING IN A CONNECTORIZED MULTI-FIBER, FIBER OPTIC CABLE SYSTEM, AND RELATED FIBER OPTIC CABLES AND ASSEMBLIES

BACKGROUND

1. Field of the Disclosure

The technology of the disclosure relates to connectorized multi-fiber, fiber optic cable preparations and manufacture, and related cables, assemblies, and systems. The connectorized multi-fiber, fiber optic cables, assemblies, and systems may be used as medium for data transfer between data processing units, including in high performance computing systems, as an example.

2. Technical Background

The increasing trend towards high performance computing (HPC) is driving the need for increased bandwidth of data communications between electrical data processing units. For example, communication rates between electrical data processing units may require data transfer rates of Gigabits per second (Gps) or even tens (10s) of Gps. In this regard, optical fibers are increasingly being used in lieu of copper wires as a communication medium between these electrical data processing units for high data rate communications. One or more optical fibers are packaged in a cable to provide a fiber optic cable for communicatively connecting electrical data processing units. Optical fiber is capable of transmitting an extremely large amount of bandwidth compared to a copper conductor with less loss and noise. An optical fiber is also lighter and smaller compared to a copper conductor having the same bandwidth capacity.

An example of a connectorized fiber optic cable arrangement 10 that may be used to interconnect electrical data processing units is illustrated in FIG. 1. As illustrated in FIG. 1, the connectorized fiber optic cable arrangement 10 includes three fiber optic cables 12, 14, and 16. The break lines illustrated in FIG. 1 in the fiber optic cables 12, 14, and 16 signify that these fiber optic cables 12, 14, and 16 can be of any length desired. This fiber optic cable arrangement 10 may be used to connect four (4) electrical data processing units as an example. As an example, each fiber optic cable 12, 14, 16 may include twelve (12) optical fibers. Each fiber optic cable 12, 14, 16 is connectorized on each end with a fiber optic connector A, B, B', C, C', D. The fiber optic connectors A, B, B', C, C', D allow each fiber optic cable 12, 14, 16 to be connected to an electrical data processing unit. In this example, each fiber optic connector A, B, B', C, C', D is a twelve-fiber multi-fiber termination push-on (MTP) connector to provide bandwidth in the capacity of twelve (12) optical fibers.

With continuing reference to FIG. 1, the fiber optic cable 12 is comprised of two fiber optic connectors A, B on each end. The fiber optic connector A may be connected to a first electrical data processing unit (not shown). The fiber optic connector B may be connected to a second electrical data processing unit to connect the first electrical data processing unit to the second electrical data processing unit via optical fiber in the fiber optic cable 12. Similarly, the fiber optic cable 14 is comprised of two fiber optic connectors B' and C, where the fiber optic connector B' can be connected to the same (second) electrical data processing unit as the fiber optic connector B. Similarly, the fiber optic cable 16 is comprised of two fiber optic connectors C' and D, where the fiber optic connector C' can be connected to the same (second) electrical data processing unit as the fiber optic connector C. The fiber optic connector D can be connected to yet another electrical data processing system to carry optical signals to and from the fiber optic connector C'.

The fiber optic cable arrangement 10 in FIG. 1 provides twelve (12) optical fibers for data communications. But, HPC may require much greater bandwidth. Thus, higher optical fiber densities may need to be provided in a fiber optic cable arrangement. To support this need, optical fibers can be provided in smaller sizes to allow for more optical fibers to be disposed in a fiber optic cable. For example, if a fifty (50) micrometer (μm) diameter optical fiber is coated up to a seventy-five (75) μm diameter and packaged into a conventional 2.0 millimeter (mm) outer diameter (OD) fiber optic cable, two hundred (200) or more optical fibers are possible to be packaged in the 2.0 mm OD fiber optic cable as an example.

The same connectorized fiber optic cable arrangement 10 provided in FIG. 1 could also be employed with higher optical fiber count fiber optic cable, but with challenges. For example, maintaining the same ordering of the optical fibers is a challenge. Ordering is the particular assignment of an optical fiber to a particular location or channel in a connector so that fiber optic cables can be interchangeably used and maintain the same fiber-to-fiber connections. To maintain ordering, the fiber optic connectors A, B, B', C, C', D could be designed to maintain a determined ordering of each optical fiber in the fiber optic cables 12, 14, 16. However, this may not be possible with standard fiber optic connector types for higher fiber counts unless the optical fiber count is split among multiple fiber optic cables from point-to-point (e.g., A to B, B to C, C to D). For example, if a two-hundred (200) optical fiber count is desired, and the available fiber optic connectors only support a forty-eight (48) optical fiber count maximum, five (5) fiber optic cables would be required between each point-to-point adding both complexity, space issues, and cost.

SUMMARY OF THE DETAILED DESCRIPTION

Embodiments disclosed in the detailed description include methods of reducing and/or avoiding fiber ordering during preparations of a multi-fiber, fiber optic cable to provide a connectorized multi-fiber, fiber optic cable system. Related fiber optic cables and assemblies are also disclosed. The embodiments disclosed herein allow for a section of a multi-fiber, fiber optic cable to be prepared to form two or more connectorized fiber optic cables as part of a multi-fiber cable system without requiring a specific fiber ordering in the fiber optic connectors. To accomplish this feature, the natural ordering of the optical fibers in the fiber optic cable is fixed in place in at least one section of the fiber optic cable before the optical fibers are cut to form adjacent fiber optic connectors in the cable system. A "natural fiber ordering" means the fiber ordering that exists as a result of the arrangement of the optical fibers inside the fiber optic cable and as altered when the optical fibers move or translate as a section of the fiber optic cable is windowed (i.e., cable jacket removed) and optical fibers exposed and/or disposed in a ferrule. Thus, the fiber ordering between adjacent fiber optic connectors in the cable system will be the same even though the fiber ordering of the optical fibers was random during cable preparations. In other embodiments, one or more of the cable ends can be provided according to a specific fiber ordering if desired.

In one embodiment, a method of preparing connectorized ends in a multi-fiber, fiber optic cable to provide a multi-fiber, fiber optic cable system is provided. The method comprises providing a multi-fiber, fiber optic cable at a length. The method also comprises windowing a section of the multi-fiber, fiber optic cable at a first access point to expose optical fibers disposed in the multi-fiber, fiber optic cable. The method also comprises placing at least a portion of the exposed optical fibers from the windowed section of the multi-fiber, fiber optic cable into at least one channel in an interior space of a double ferrule having a first end and a second end, the optical fibers exposed through both the first end and the second end of the double ferrule to form a double ferrule assembly. The method also comprises fixing the ordering of the optical fibers disposed in the double ferrule assembly in a fixed ordering. The method also comprises cutting the double ferrule assembly between the first end of the double ferrule and the second end of the double ferrule to provide a first ferrule having a first end face and a second ferrule having a second end face, wherein the optical fibers disposed through the first end face and the optical fibers disposed through the second end face both have the fixed ordering.

In another embodiment, a multi-fiber cable system is provided. The system comprises a first multi-fiber, fiber optic cable comprising a first plurality of optic fibers. The first multi-fiber, fiber optic cable also comprises a first end having a first multi-fiber, fiber optic connector assembly disposed thereon having a first fiber ordering of the first plurality of optical fibers. The first multi-fiber, fiber optic cable also comprises a second end having a second multi-fiber, fiber optic connector assembly disposed thereon having a second fiber ordering of the first plurality of optical fibers different from the first fiber ordering. The system also includes a second multi-fiber, fiber optic cable comprising a second plurality of optic fibers. The second multi-fiber, fiber optic cable also comprises a first end having a third multi-fiber, fiber optic connector assembly disposed thereon having the second fiber ordering for the second plurality of optical fibers. The second multi-fiber, fiber optic cable also comprises a fourth end having a second multi-fiber, fiber optic connector assembly disposed thereon having a third fiber ordering of the second plurality of optical fibers different from the second fiber ordering.

Any number of additional multi-fiber, fiber optic cables could be provided in the multi-fiber cable system to avoid and/or reduce the need fiber ordering. As one non-limiting example, the multi-fiber cable system could further comprise a third multi-fiber, fiber optic cable comprised of a third plurality of optic fibers. The third multi-fiber, fiber optic cable could also comprise of a fifth end having a fifth multi-fiber, fiber optic connector assembly disposed thereon having the third fiber ordering for the third plurality of optical fibers. The third multi-fiber, fiber optic cable could also comprise a sixth end having a sixth multi-fiber, fiber optic connector assembly disposed thereon having a fourth fiber ordering of the third plurality of optical fibers different from the third fiber ordering.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIG. 8 illustrates an exemplary method and fiber optic ferrule for supporting optical fibers resulting from preparations to a multi-fiber, fiber optic cable for reducing and/or avoiding fiber ordering to prepare connectorized ends for multi-fiber, fiber optic cables in a multi-fiber cable system;

FIGS. 12A-12C illustrates another exemplary method and fiber optic ferrule for supporting optical fibers resulting from preparations to a multi-fiber, fiber optic cable for reducing and/or avoiding fiber ordering to prepare connectorized ends for multi-fiber, fiber optic cables in a multi-fiber cable system; and FIGS. 13A and 13B illustrate another exemplary method of forming a fiber optic ferrule for supporting optical fibers resulting from preparations to a multi-fiber, fiber optic cable for reducing and/or avoiding fiber ordering to prepare connectorized ends for multi-fiber, fiber optic cables in a multi-fiber cable system.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

As a non-limiting example, it may be desired to provide a high density, high bandwidth, fiber optic cable system that includes a large number of optical fibers for applications requiring high bandwidth or data transfer rates, such as for high performance computing (HPC) applications as an example. These applications may require Gigabits per second (Gps), tens of Gps, or even hundreds of Gps of data transfer capability in a communication medium, and thus why optical fiber for such communication medium presents an excellent choice. Multiple fiber optic cables may be required for a particular application where the connectorized ends between cables require an assigned fiber ordering for compatibility reasons. However, standard fiber optic ferrules that allow for assigning particular fiber ordering (i.e., location in the ferrule) for fiber optic connectors may not readily exist to support a larger number of optical fibers in a single fiber optic cable for high bandwidth applications.

In this regard, embodiments disclosed in the detailed description include methods of reducing and/or avoiding fiber ordering during preparations of a multi-fiber, fiber optic cable to provide a connectorized multi-fiber, fiber optic cable system. Related fiber optic cables and assemblies are also disclosed. The embodiments disclosed herein allow for a section of a multi-fiber, fiber optic cable to be prepared to form two or more connectorized fiber optic cables as part of a multi-fiber cable system without requiring a specific fiber ordering in the fiber optic connectors. To accomplish this feature, the ordering of the optical fibers in the fiber optic cable as they exist without manipulation of ordering (i.e., the natural ordering), is fixed in place in at least one section of the fiber optic cable before the optical fibers are cut to form adjacent fiber optic connectors in the cable system. Thus, the fiber ordering between adjacent fiber optic connectors in the cable system will be the same even though the fiber ordering of the optical fibers was random during cable preparations. In other embodiments, one or more of the cable ends can be provided according to a specific fiber ordering if desired.

Figure 1:
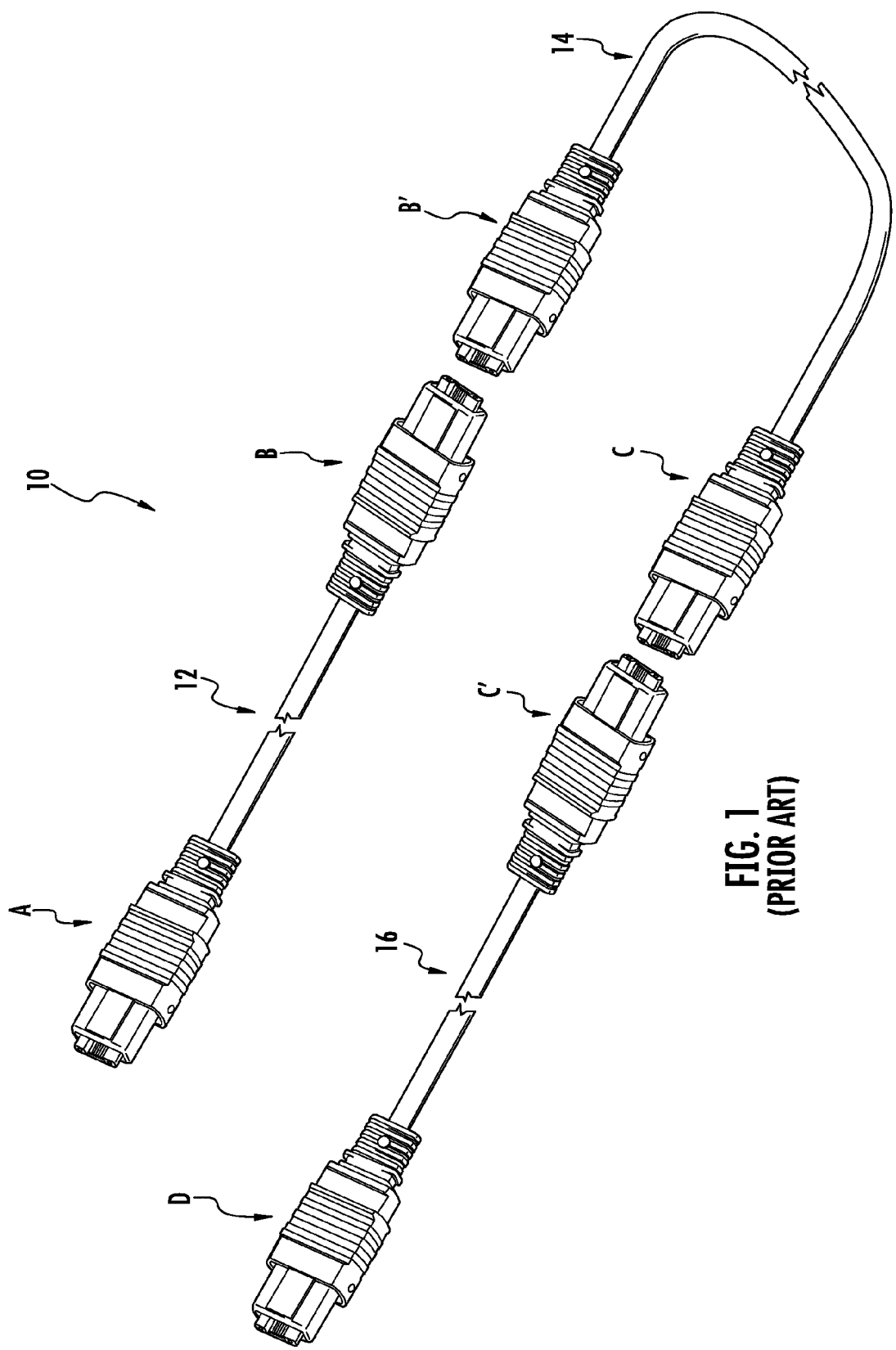
FIG. 1 illustrates an exemplary connectorized fiber optic cable arrangement that can be employed to interconnect electrical data processing units.
Figure 2A:
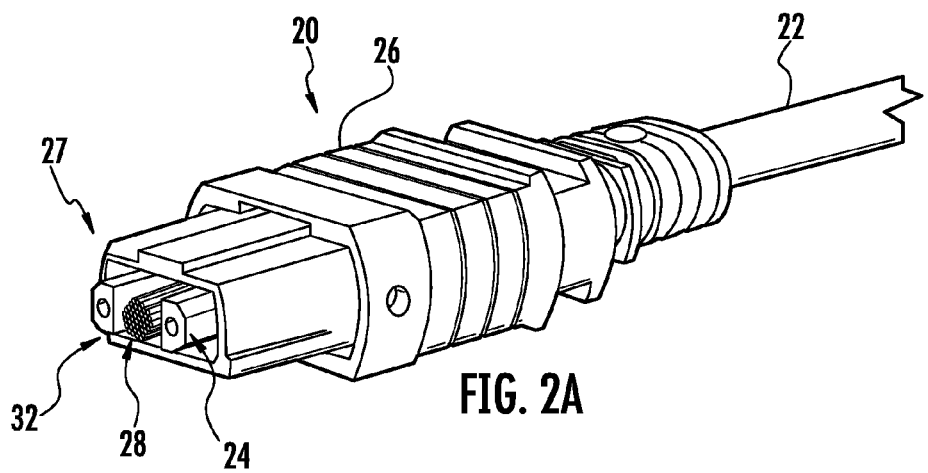
FIG. 2A is a perspective view of a fully assembled, multi-fiber termination push-on (MTP) connectorized end of a high density multi-fiber, fiber optic cable resulting from method(s) of reducing and/or avoiding fiber ordering during preparations of connectorized ends for multi-fiber, fiber optic cables in a multi-fiber cable system.
Figure 2B:
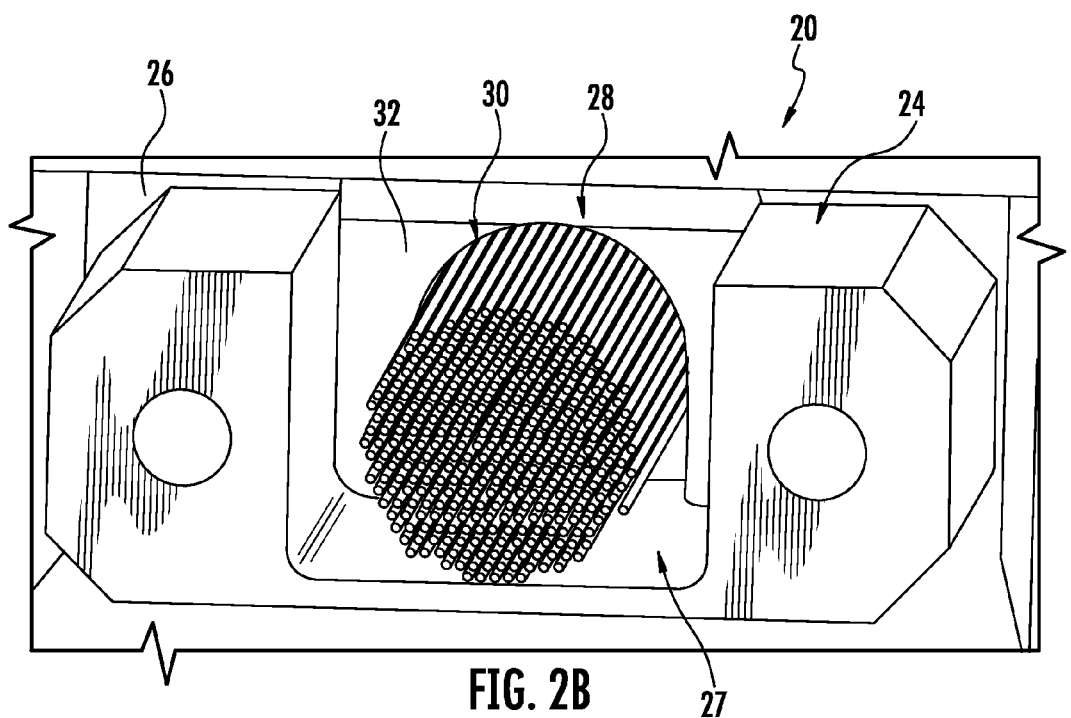
FIG. 2B is an enlarged end view of the connectorized end of the multi-fiber, fiber optic cable in FIG. 2A.

An exemplary connectorized end supporting a large number of optical fibers from a multi-fiber, fiber optic cable prepared using the methods of reducing and/or avoiding fiber ordering during preparations disclosed herein is first described. In this regard, FIGS. 2A and 2B illustrate a fully assembled, multi-fiber termination push-on (MTP) connectorized end 20 (or "connectorized end 20") of one multi-fiber, fiber optic cable 22 (or "fiber optic cable 22"). FIG. 2A is a perspective view of the fully assembled, MTP connectorized end 20 of the multi-fiber, fiber optic cable 22. FIG. 2B is an enlarged end view of the connectorized end 20 of the multi-fiber, fiber optic cable 22 in FIG. 2A. The connectorized end 20 of the fiber optic cable 22 resulted from method(s) of reducing and/or avoiding fiber ordering during preparations of connectorized ends for multi-fiber, fiber optic cables in a multi-fiber cable system, as will be described in more detail below.

With continued reference to FIGS. 2A and 2B, an MTP ferrule 24 (or "ferrule 24") is provided in an MTP connector 26 on an end 27 of the fiber optic cable 22. The number of optical fibers 28 provided in the fiber optic cable 22 may be hundreds, for example, two hundred (200) or more. For example, the number of optical fibers 28 provided in the fiber optic cable 22 is three hundred and fifty (350) in this example. To provide for a large number of the optical fibers 28 to be provided in a fiber optic cable 22 that is of acceptable size to be desirable, the size of the optical fibers 28 may be minimized. For example, the outer diameter of the optical fibers 28 may be selected to be between forty (40) and sixty (60) micrometers (μm) (e.g., 50 μm) of glass (e.g., core with or without cladding) and having an outer diameter of 70-100 μm (e.g., 75 μm) when coated. This may allow a large number of the optical fibers 28 to be provided in a smaller sized fiber optic cable 22. For example, the outer diameter of the fiber optic cable 22 may be less than 5.1 millimeters (mm), and 2.0 mm or approximately 2.0 mm (e.g., 1.9 mm to 2.1 mm) in one example.

With continued reference to FIGS. 2A and 2B, the MTP ferrule 24 is provided in the MTP connector 26 as one example of a convenient ferrule that can be employed to connectorize a larger number of optical fibers 28 from the fiber optic cable 22. The MTP ferrule 24 in this example was not selected because of an exclusive ability to support a larger number of optical fibers for fiber optic connections. The MTP ferrule 24 was selected in this embodiment as a convenient ferrule type to provide a standard connector type to allow for mating of ferrules for fiber optic connections. The MTP ferrule 24 is one example of a convenient ferrule type that contains an opening 30 sized to allow the desired large number of optical fibers 28 to be supported by the ferrule 24 for high density fiber optic connections in a fiber optic cable system. However, as will be described, other ferrule types are possible, and the methods and cable systems disclosed herein are not limited to any particular ferrule type. As will be described herein, custom ferrule types or form factors can also be employed if desired.

With the methods disclosed herein, the selection of a ferrule is not based on how the ferrule design may allow or encourage specific assignment optical fibers to specific locations or channels in an end face 32 of the ferrule 24. For example, as illustrated in FIG. 2B, optical fibers 28 from the fiber optic cable 22 exposed through the end face 32 of the ferrule 24 are not assigned to a particular fiber order or separated to particular locations by the ferrule 24. This may be advantageous, because standard ferrule types may not be available that support allowing for optical fibers to be assigned specific locations in an end face of the ferrule for the number of optical fibers provided in a fiber optic cable to create the fiber optic cable system. Further, even if a ferrule type was available to allow for specific assignment of location of optical fibers, providing such during assembly may be extremely costly in terms of labor and complexity.

In this regard, with reference back to FIGS. 2A and 2B, the optical fibers 28 are arranged in random order through the opening 30 in the end face 32 of the ferrule 24. As will be described in this disclosure, the methods of preparing fiber optic cable systems disclosed herein do not require the optical fibers, including the optical fibers 28 exposed from the ferrule 24 of the MTP connector 26 in FIGS. 2A and 2B, to be specifically ordered to provide a compatible fiber optic cable system.

Figure 3A:
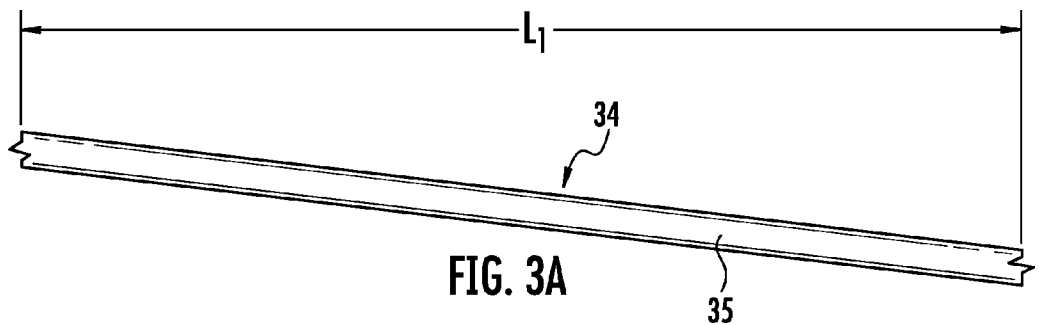
FIGS. 3A-3I illustrate exemplary preparations to a multi-fiber, fiber optic cable for reducing and/or avoiding fiber ordering to prepare MTP connectorized ends for high density multi-fiber, fiber optic cables in a multi-fiber cable system.
Figure 3B:
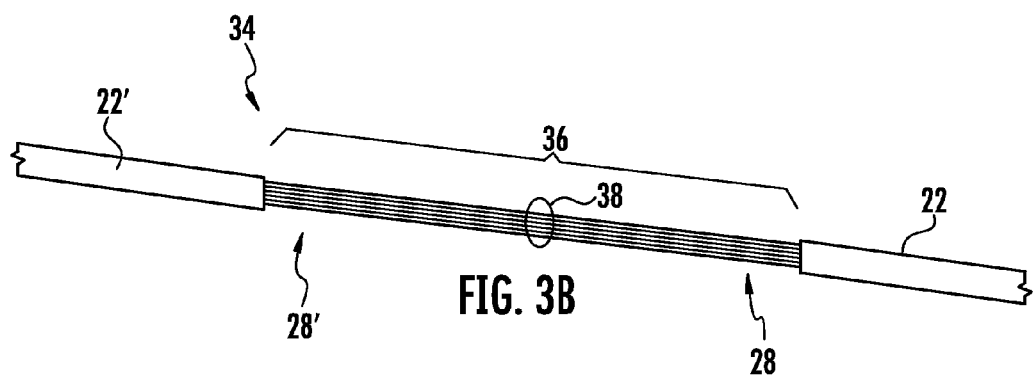
Figure 3C:
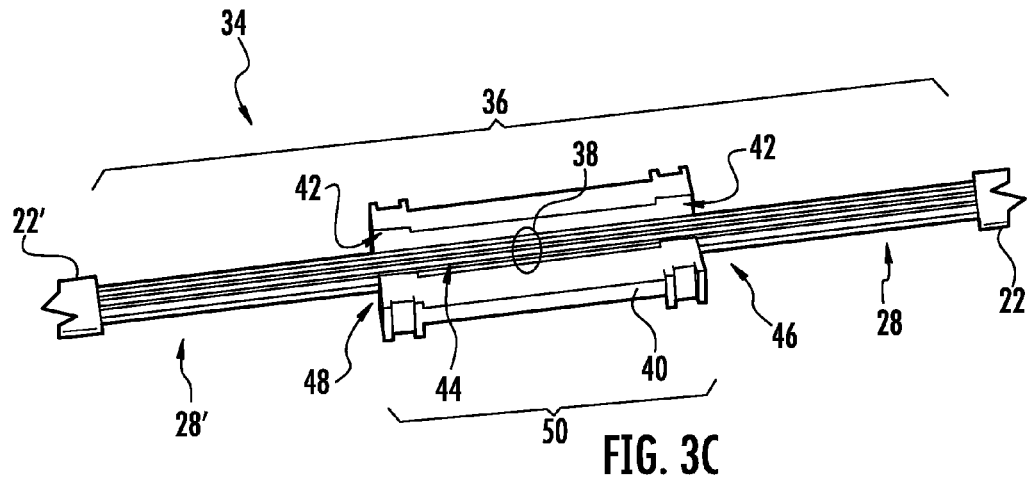
Figure 3D:
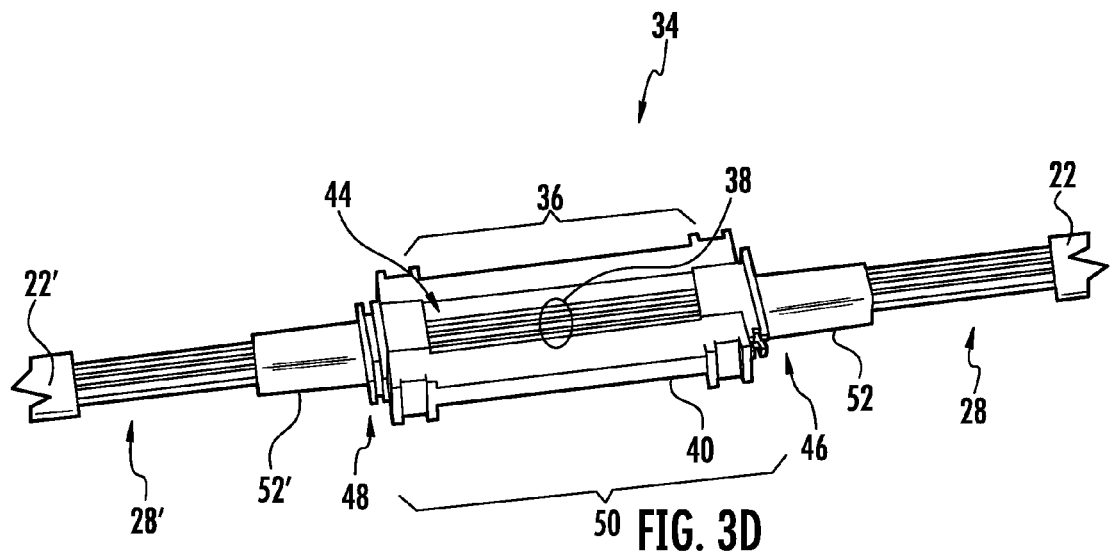
Figure 3E:
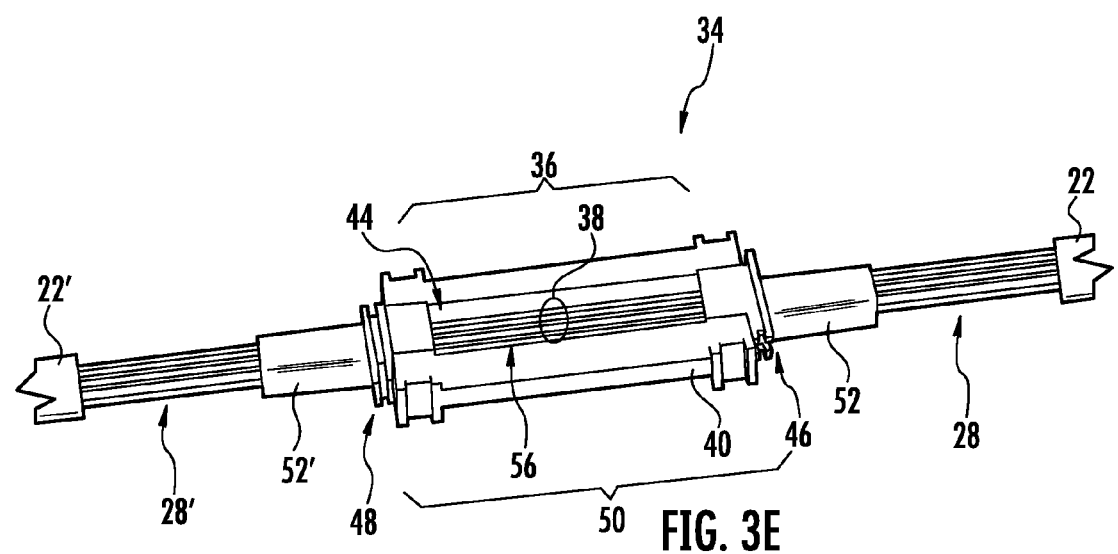
Figure 3F:
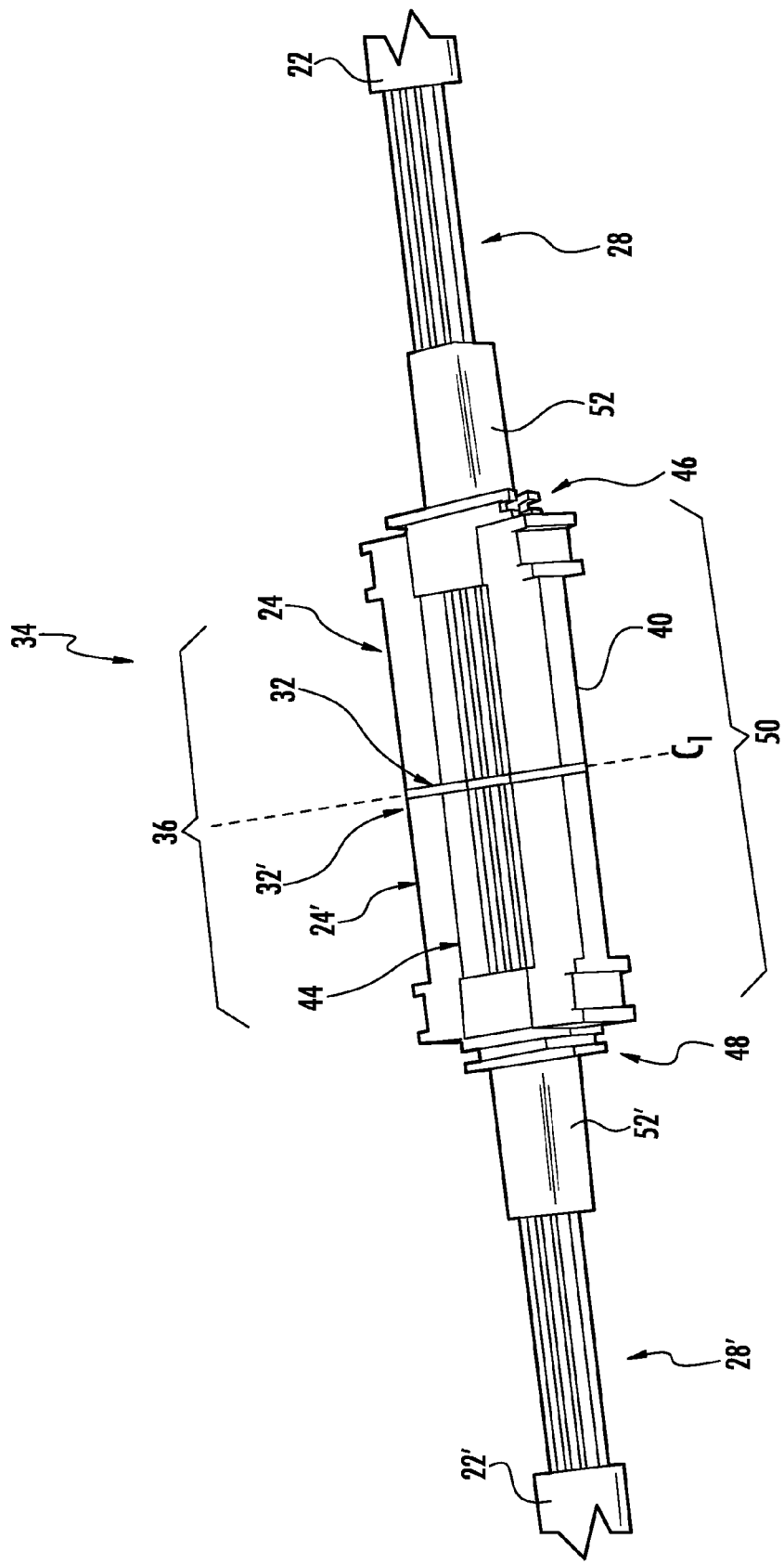
Figure 3G:
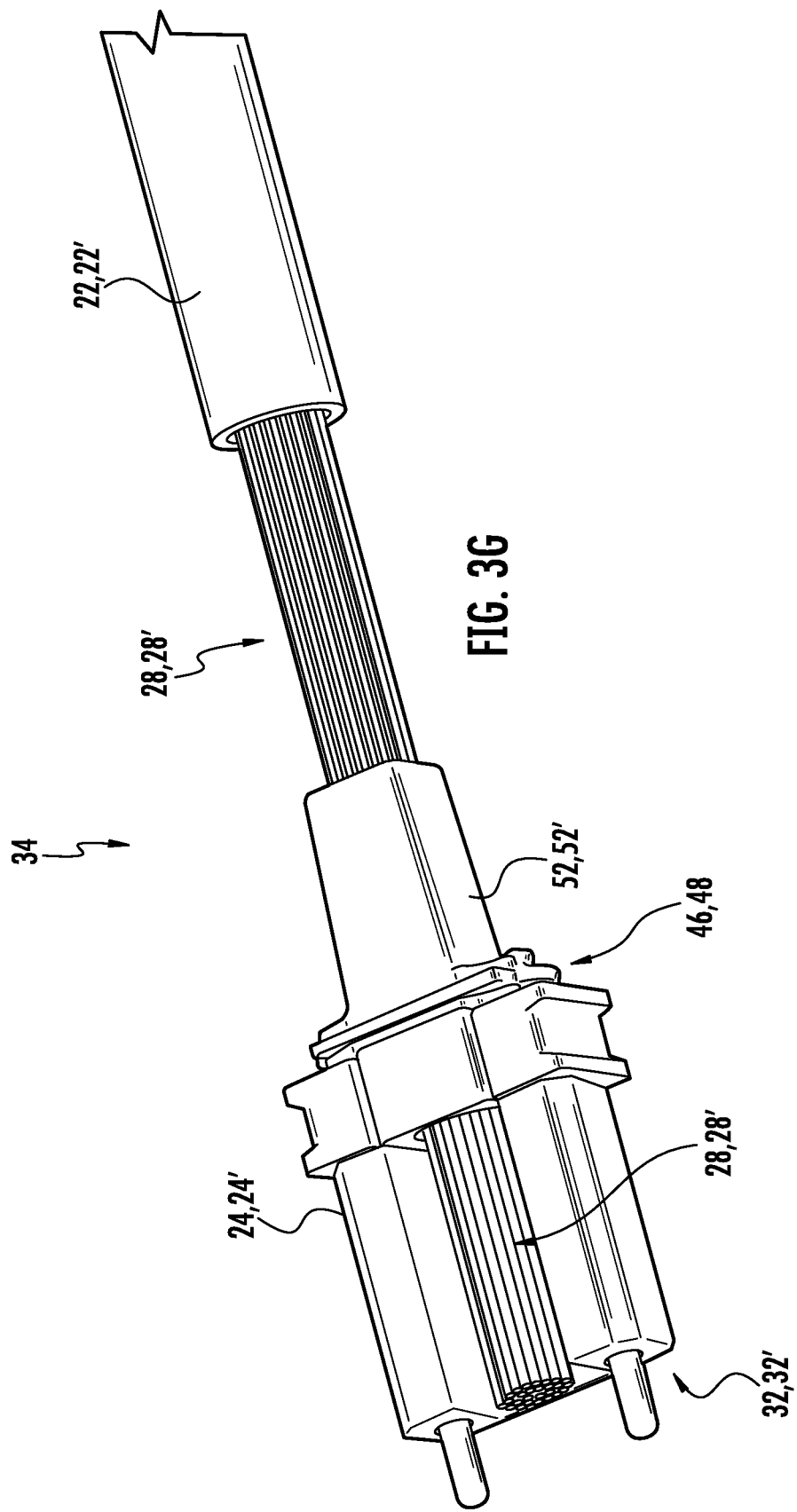
Figure 3H:
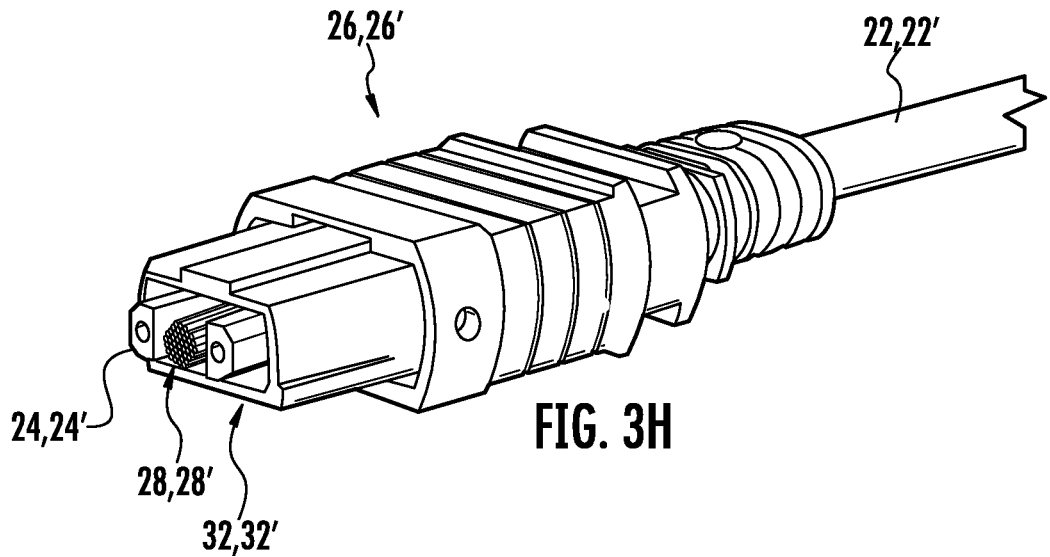
Figure 3I:
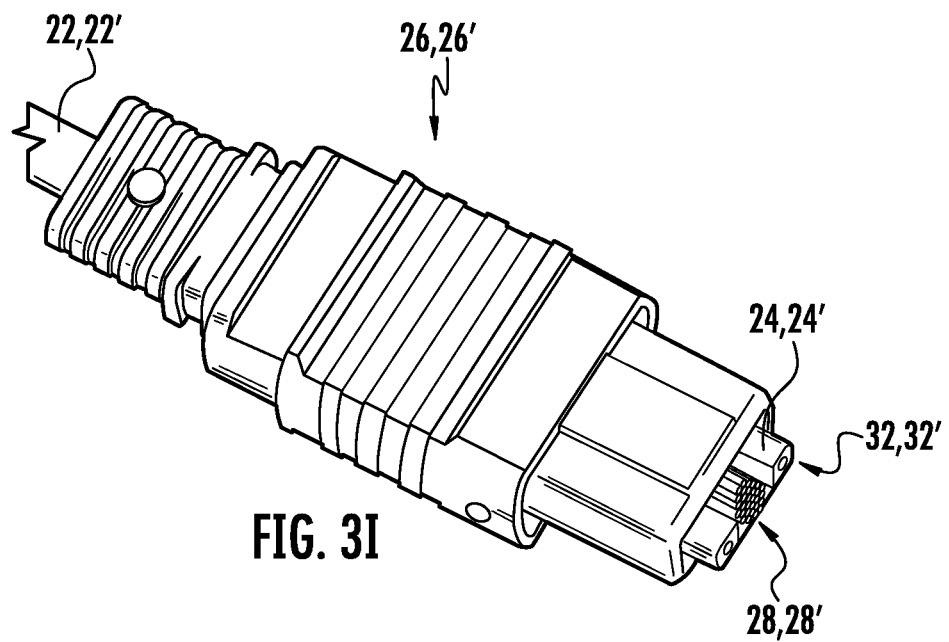

FIGS. 3A-3I illustrate exemplary preparations to a fiber optic cable 34 that will eventually produce at least two fiber optic cables for a fiber optic cable system, one of which is the fiber optic cable 22 in FIGS. 2A and 2B in this example. These preparations reduce and/or avoid fiber ordering to prepare connectorized ends for high-density multi-fiber, fiber optic cables in a multi-fiber cable system. FIGS. 3A-3F illustrate exemplary preparations to the fiber optic cable 34 before the fiber optic cable 34 is separated into two separate fiber optic cables, one of which is the fiber optic cable 22 in FIGS. 2A and 2B, to form part or a whole of a fiber optic cable system. FIGS. 3F-3G illustrate exemplary preparations to connectorize ends of the fiber optic cable 34 once prepared using the preparations described and illustrated in FIGS. 3A-3E. FIGS. 3H and 3I illustrate the fiber optic cables for the fiber optic cable system prepared from the fiber optic cable 34 when the MTP connector 26 is fully assembled on the ends of the fiber optic cables.

FIG. 3A illustrates the multi-fiber, fiber optic cable 34. The multi-fiber, fiber optic cable 34 may be a high-density fiber optic cable that includes a larger number of optical fibers to support high data rate transfers. For example, the fiber optic cable 34 can include the same exemplary characteristics and fiber count as the fiber optic cable 22 discussed above in FIGS. 2A and 2B, since the fiber optic cable 22 was prepared from the fiber optic cable 34, as will be described below. The fiber optic cable 34 may include an outer cable jacket 35 to protect optical fibers disposed within the fiber optic cable 34. The fiber optic cable 34 is provided at the desired length $L_1$ for the entire length of the fiber optic cable system to be prepared and manufactured, as illustrated in FIG. 3A. A section 36 of the fiber optic cable 34 is windowed to expose the optical fibers 38 disposed in the fiber optic cable 34. For example, windowing may involve stripping away the outer cable jacket 35 from the fiber optic cable 34 to expose the optical fibers 38 disposed in the fiber optic cable 34. A stripping tool or other tool may be employed to strip away the outer cable jacket 35.

Note that the optical fibers 38 referenced in FIG. 3B are the same optical fibers 28 in the fiber optic cable 22 in FIGS. 2A and 2B after preparations are completed in accordance with FIGS. 3A-3I to prepare the fiber optic cable system. These preparations will eventually provide a cutting of the fiber optic cable 34 and optical fibers 38 disposed therein to provide at least two separate fiber optic cables from the single fiber optic cable 34. In this example, two fiber optic cables will be produced from the single fiber optic cable 34: the fiber optic cable 22 supporting optical fibers 28, and another fiber optic cable 22' supporting optical fibers 28', as illustrated in FIG. 3B.

After windowing of the section 36 of the fiber optic cable 34 to the expose the optical fibers 38, the optical fibers 38 in this example are placed in a double ferrule 40, as illustrated in FIG. 3C. At least a portion of the exposed optical fibers 38 from the windowed section 36 of the fiber optic cable 34 are disposed in a channel 42 in an interior space 44 of the double ferrule 40. The exposed optical fibers 38 are exposed through both a first end 46 and a second end 48 of the double ferrule 40 to form a double ferry assembly 50. The double ferrule 40 in the double ferrule assembly 50 provides a structure that can be cut to provide two opposing ferrules that can be connectorized to provide compatible adjacent fiber optic connectors as part of the fiber optic cable assembly. It may be desired to try to suppress angles in the double ferrule 40 to avoid kerf resulting in offset in the optical fibers 38.

At this point, the natural fiber ordering of the exposed optical fibers 38 in the interior space 44 of the double ferrule 40 can be fixed to ensure that the fiber ordering does not change as further preparations are made. A "natural fiber ordering" means the fiber ordering that exists as a result of the arrangement of the optical fibers 38 inside the fiber optic cable 34 and as altered when the optical fibers 38 move or translate as the section 36 is windowed and the optical fibers 38 exposed and disposed in the double ferrule 40. In this regard, as illustrated in FIG. 3D, the first end 46 and the second end 48 of the double ferrule 40 is sealed with collars 52, 52' so a potting material 56 disposed in the interior space 44 of the double ferrule 40 is retained in the interior space 44 of the double ferrule 40, as illustrated in FIG. 3E. For example, the collars 52, 52' may be sealed on the first end 46 and the second end 48 of the double ferrule 40 using an Ultraviolet (UV) adhesive, an epoxy, and room temperature vulcanizing (RTV). The potting material 56 is used to fix the fiber ordering, as it exists up through this point in preparations, of the exposed optical fibers 38 disposed in the interior space 44 of the double ferrule 40. The double ferrule assembly 50 may then be cured in an oven or through other heat source to solidify the potting material 56 in the interior space 44 of the double ferrule 40 to fix the fiber ordering of the optical fibers 38. For example, the double ferrule assembly 50 may be cured at temperatures between 20 degrees Celsius and 300 degrees Celsius and/or for a period of time such as up to two (2) minutes, as non-limiting examples. Thus, when the double ferrule assembly 50 is cut to form two separate ferrules from the double ferrule 40, the fiber order of the optical fiber 38 will be the same between both ferrules without the fiber order having to be assigned.

In this regard, FIG. 3F illustrates the double ferrule assembly 50 after the double ferrule 40 has been cut between the first end 46 and the second end 48. In this embodiment, the double ferrule 40 is cut in half at center line $C_1$ to provide a first ferrule 24 having a first end face 32 and a second ferrule 24' having a second end face 32'. The cutting of the double ferrule 40 also provides two fiber optic cables 22, 22'. For example, the double ferrule 40 may be cut using a laser, a diamond blade, and/or an abrasive wire. The first ferrule 24 is provided as part of the fiber optic cable 22, and the second ferrule 24' is provided as part of the fiber optic cable 22'. As previously discussed, the optical fibers 28 that are disposed through the first ferrule 24 and the optical fibers 28' that are disposed through the second ferrule 24' have the same fiber ordering since the fiber ordering was filed at the center line $C_1$ when the potting material 56 was disposed in the interior space 44 of the double ferrule 40. Thus, the first ferrule 24 and the second ferrule 24' are compatible, meaning they contain exposed optical fibers 28, 28' having the same fiber ordering, and without the fiber ordering having to have been assigned or selected in the ferrules 24, 24'.

The optical fibers 28, 28' may then be polished or planarization preparations made to prepare the fiber optic cables 22, 22' for use. Rough polishing may be provided. Also, flock polishing of the optical fibers 28, 28' may be performed. The exact polishing preparations and steps may depend on the material selected for the ferrules 24, 24'. For example, if ULTEM® is selected, flock polishing sequences may be appropriate.

FIG. 3G illustrates one of the fiber optic cables 22 or 22' after the double ferrule 40 is cut and the optical fibers 28 or 28' exposed through the end face 32 or 32'. FIGS. 3H and 3I illustrate right and left perspective views, respectively, of one of the fiber optic cables 22 or 22' after the ferrule 24 or 24' has been connectorized, which in this example is an MTP connector 26 or 26'. As can be seen from FIG. 3H, once the double ferrule 40 is cut and the ferrules 24, 24' are produced and connectorized as a result of the above discussed preparations, the fiber optic cable 22, 22' produced for the fiber optic cable system appears like the connectorized fiber optic cable 22 in FIG. 2A.

The methods of reducing and/or avoiding fiber ordering during preparations of the fiber optic cable 34 in FIG. 3A to provide connectorized multi-fiber, fiber optic cables 22, 22' described above allow providing a cable system. The cable system, in the example of FIGS. 3A-3I, is comprised of two fiber optic cables 22, 22' each having MTP connectors 26, 26' having the same fiber ordering although fiber ordering was not specifically assigned. However, this method and other exemplary methods herein can be employed to produce any number of fiber optic cables for a fiber optic cable system, as discussed below.

Figure 4:
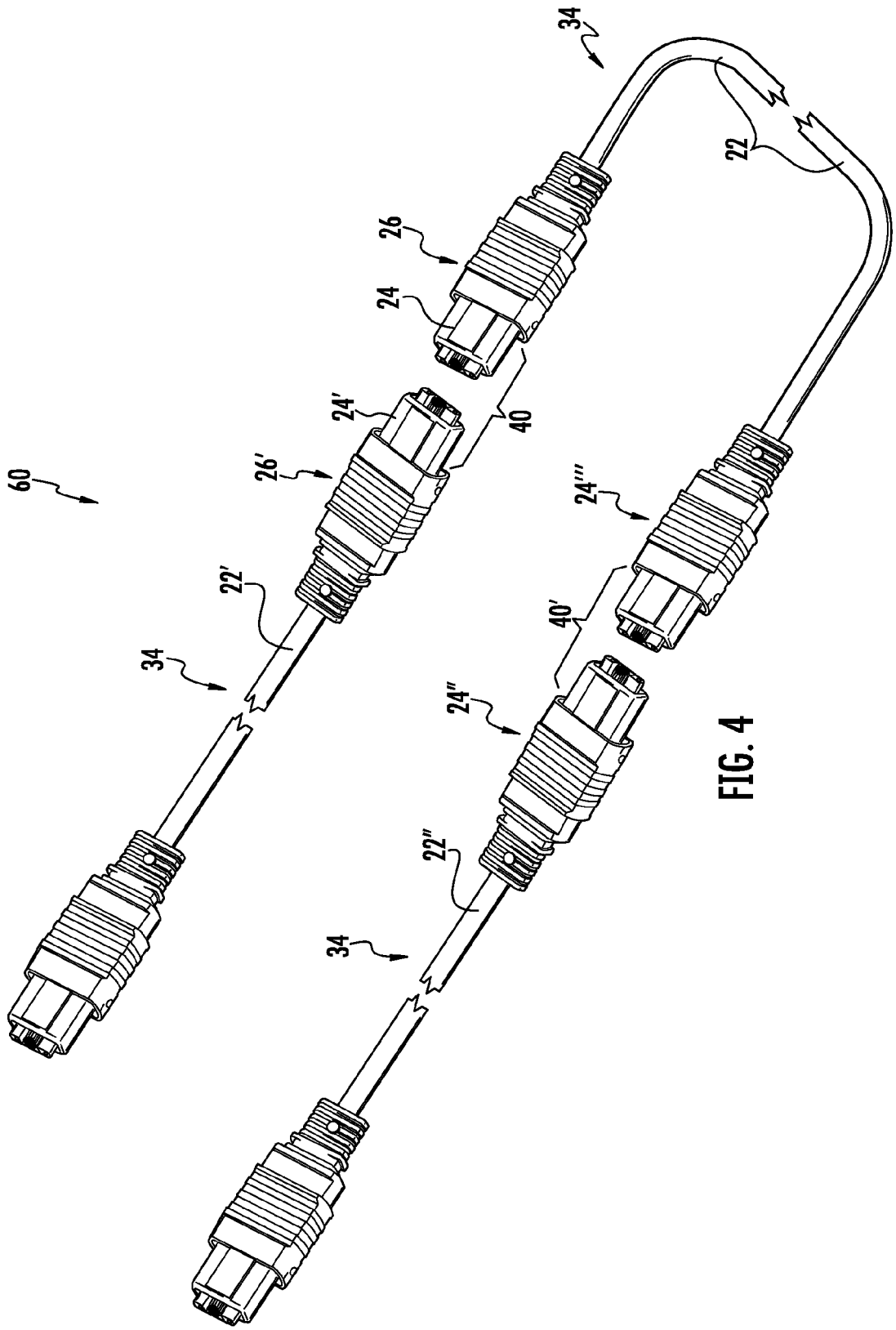
FIG. 4 illustrates an exemplary high density MTP connectorized fiber optic cable arrangement and system prepared from preparations to a multi-fiber, fiber optic cable for reducing and/or avoiding fiber ordering to prepare high density MTP connectorized ends for multi-fiber, fiber optic cables in a multi-fiber cable system.

In this regard, FIG. 4 illustrates an exemplary high density MTP connectorized fiber optic cable system 60 prepared from preparations to the multi-fiber, fiber optic cable 34 illustrated in FIG. 3A described above. As illustrated in FIG. 4, the fiber optic cable system 60 is comprised of three (3) fiber optic cables in this example: the fiber optic cables 22 and 22' previously discussed and illustrated above, and a third fiber optic cable 22". The single length of fiber optic cable 34 illustrated in FIG. 3A was used to produce all three fiber optic cables 22, 22', and 22" in the example fiber optic cable system 60 in FIG. 4.

With continuing reference to FIG. 4, the three fiber optic cables 22, 22', and 22" provided in the fiber optic cable system 60 were created as a result of providing two double ferrules 40, 40' in two different sections of the fiber optic cable 34 in FIG. 3A according to the method described above. The fiber optic cable 22 may be considered an intermediate or jumper cable in this exemplary fiber optic cable system 60. The fiber optic cable 22' may be provided to connect a source to a detector connected to the fiber optic cable 22". In this regard, two pairs of adjacent ferrules 24, 24' were created as a result of cutting the double ferrule 40. Another two pairs of adjacent ferrules, 24", 24'" were created as a result of cutting the double ferrule 40'. Thus, in the fiber optic cable system 60, adjacent ferrules 24, 24' contain the same fiber ordering, and adjacent ferrules 24", 24'" contain the same fiber ordering. However, the fiber ordering does not have to be the same between ferrules 24, 24' and 24", 24'" for the fiber optic cable system 60 to provide fiber optic cable compatibility. All that is required is that the fiber ordering between adjacent ferrules 24, 24' and 24", 24'" have the same fiber ordering to maintain compatibility of connections between adjacent fiber optic cables 22, 22' and 22', 22". In other words, the fiber optic cable 22 is compatible with the fiber optic cables 22' and 22".

The methods described herein can also be employed with ribbon fiber optic cables or multi-ribbon fiber optic cables. In this regard, FIGS. 5A-5D illustrate exemplary preparations to a high density multi-ribbon, fiber optic cable 70 (or "fiber optic cable 70") for reducing and/or avoiding fiber ordering to prepare MTP connectorized ends for multi-ribbon, fiber optic cables in a multi-ribbon fiber optic cable system. As illustrated in the perspective view in FIG. 5A, the fiber optic cable 70 contains multiple ribbons 72(1)-72(N), with N signifying any number of ribbons. As a non-limiting example, the fiber optic cable 70 may include high fiber counts, such as thirty (30), 900 µm fibers, or alternatively a lower fiber count ribbon. Providing the multi-ribbon, fiber optic cable 70 may allow for a large number of optical fibers to be provided in a fiber optic cable to provide high-density fiber optic cable systems for high-density applications. The fiber optic cable 70 may include an outer cable jacket 74 to protect the ribbons 72(1)-72(N) disposed within the fiber optic cable 70. The fiber optic cable 70 may be provided at the desired length for the entire length of the multi-ribbon fiber optic cable system to be prepared and manufactured. A section 76 of the fiber optic cable 70 is windowed to expose the ribbons 72(1)-72(N) disposed in the fiber optic cable 70. For example, windowing may involve stripping away the outer cable jacket 74 from the fiber optic cable 70 to expose the ribbons 72(1)-72(N) disposed in the fiber optic cable 70. A stripping tool or other tool may be employed to strip away the outer cable jacket 74.

Figure 5A:
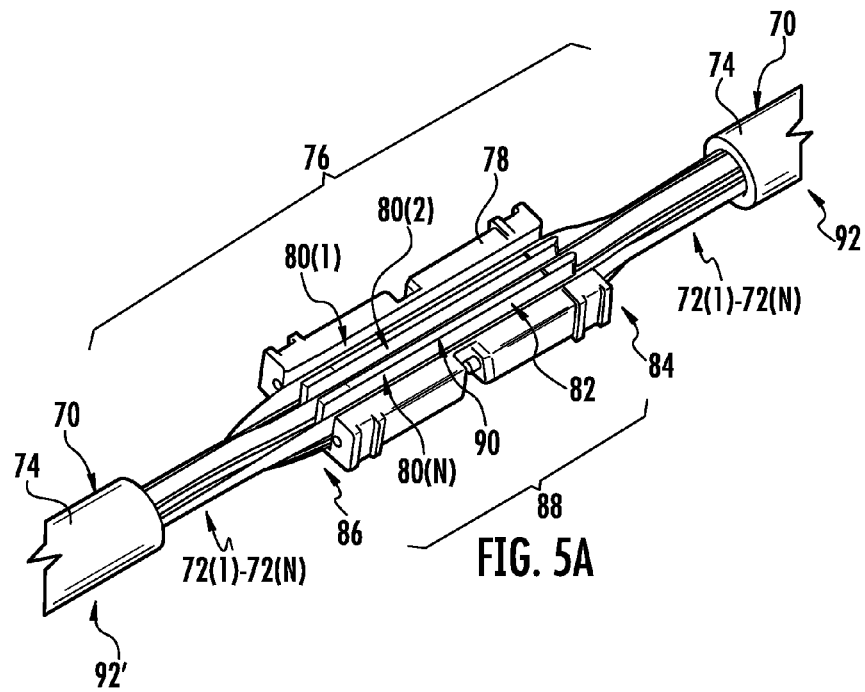
FIGS. 5A-5D illustrate exemplary preparations to a high density multi-ribbon, fiber optic cable for reducing and/or avoiding fiber ordering to prepare MTP connectorized ends for multi-ribbon, fiber optic cables in a multi-ribbon cable system.
Figure 5B:
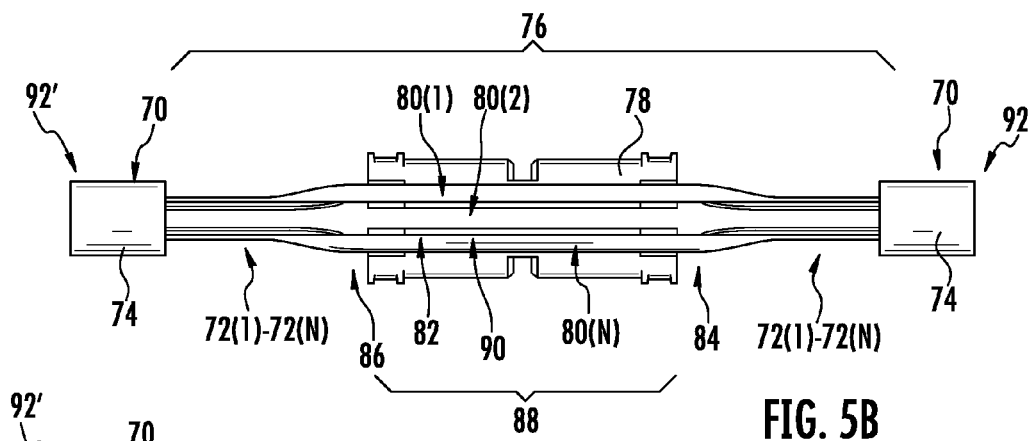
Figure 5C:
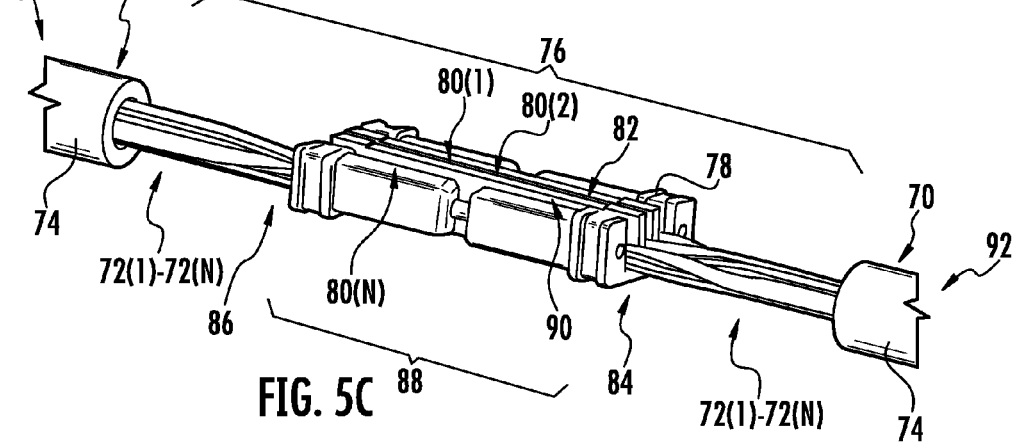
Figure 5D:
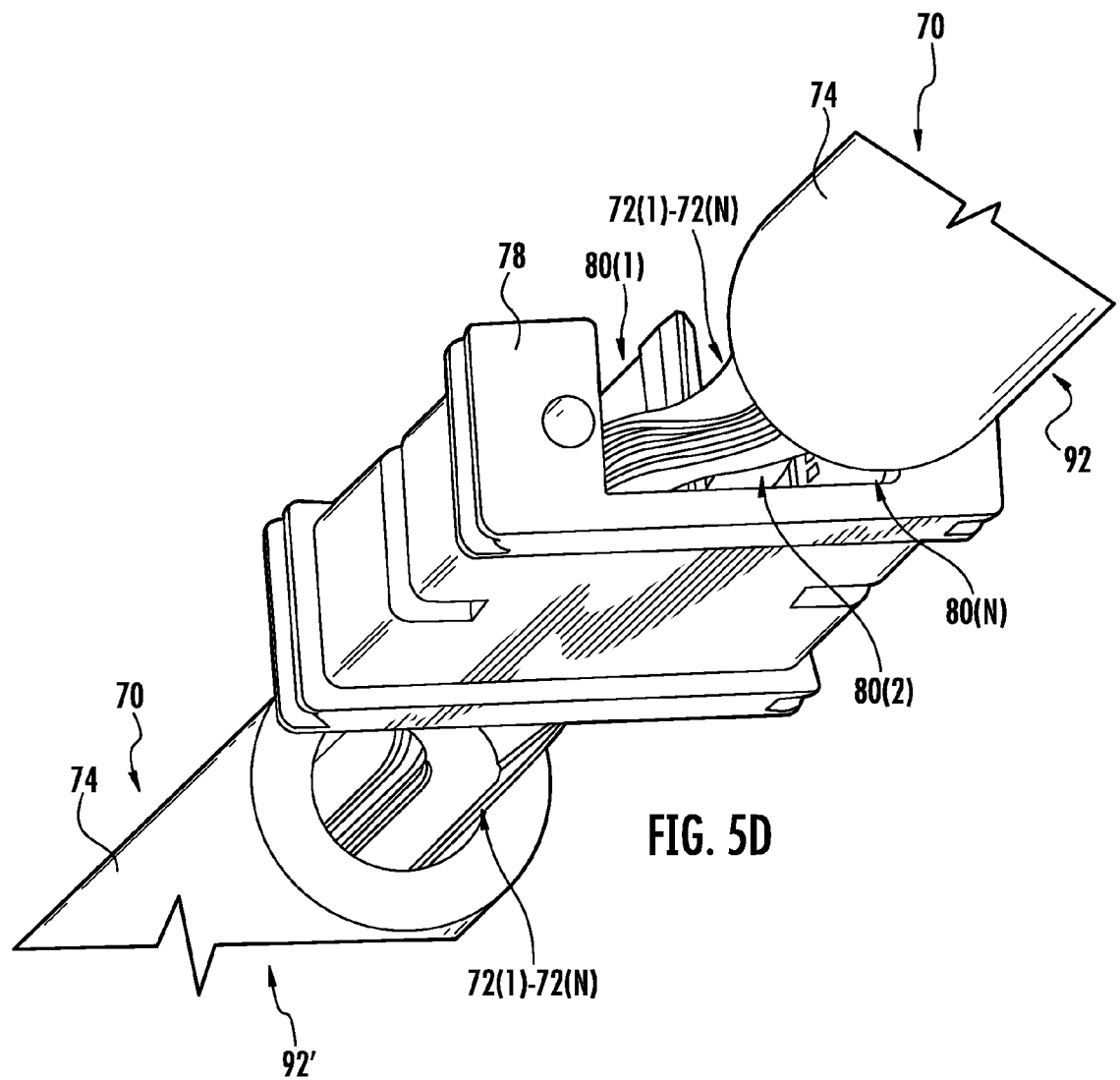

After windowing of the section 76 of the fiber optic cable 70 to the expose the ribbons 72(1)-72(N), the ribbons 72(1)-72(N) in this example are placed in a double ferrule 78, as illustrated in the perspective view in FIG. 5A. FIGS. 5B-5D illustrate top, additional perspective, and close-up perspective views, respectively, of the ribbons 72(1)-72(N) disposed in the double ferrule 78. The exposed ribbons 72(1)-72(N) from the windowed section 76 of the fiber optic cable 70 are disposed in channels 80(1)-80N in an interior space 82 of the double ferrule 78. The notation 1-N signifies that any number of channels 80 can be provided in the double ferrule 78. The double ferrule 78 may be designed to provide for an orderly and even distribution of the ribbons 72(1)-72(N) in the channels 80(1)-80(N). One ribbon 72(1)-72(N) may be disposed in a given channel 80(1)-80(N), or multiple ribbons 72(1)-72(N) may disposed in a single channel 80(1)-80(N).

With continuing reference to FIGS. 5A-5D, the exposed ribbons 72(1)-72(N) are exposed through both a first end 84 and a second end 86 of the double ferrule 78 to form a double ferrule assembly 88. The double ferrule 78 in the double ferrule assembly 88 provides a structure that can be cut to provide two opposing ferrules that can be connectorized to provide compatible adjacent fiber optic connectors as part of the fiber optic cable assembly. At this point, the natural fiber ordering of the exposed ribbons 72(1)-72(N) in the interior space 82 of the double ferrule 78 can be fixed to ensure that the ribbon 72(1)-72(N) ordering and/or fiber ordering in the ribbons 72(1)-72(N) does not change as further preparations are made. In this regard, as illustrated in FIGS. 5A-5D, the first end 84 and the second end 86 of the double ferrule 78 can optionally be sealed so a potting material 90 disposed in the interior space 82 of the double ferrule 78 is retained in the interior space 82 of the double ferrule 78. The potting material 90 is used to fix the ribbon/fiber ordering, as it exists up through this point in preparations, of the exposed optical ribbons 72(1)-72(N) disposed in the interior space 82 of the double ferrule 78.

The double ferrule assembly 88 may then be cured in an oven or through other heat source to solidify the potting material 90 in the interior space 82 of the double ferrule 78 to fix the fiber ordering of the ribbons 72(1)-72(N). For example, the double ferrule assembly 88 may be cured at temperatures between 20 degrees Celsius and 300 degrees Celsius, and/or for a period of time such as up to two (2) minutes, as non-limiting examples. Thus, when the double ferrule assembly 88 is cut to form two separate ferrules from the double ferrule 78, the fiber order of the ribbons 72(1)-72(N) and optical fibers disposed therein will be the same between both ferrules without the fiber order having to be assigned.

The double ferrule 78 is then cut between the first end 84 and the second end 86 to create two separate ferrules in the fiber optic cable 70. For example, the double ferrule 78 can be cut in half at the center of the double ferrule 78 to provide a first ferrule having a first end face and a second ferrule having a second end face. The double ferrule 78 may also include reduced cross-section portions, as illustrated in FIGS. 5A-5D, where the double ferrule 78 is to be cut to reduce cut time and to aid in fiber protrusion. The cutting of the double ferrule 78 also provides two fiber optic cables 92, 92', as illustrated in FIGS. 5A-5D. For example, the double ferrule 78 may be cut using at least one of a laser, a diamond blade, and an abrasive wire. The ordering of the ribbons 72(1)-72(N) and optical fibers therein will be fiber ordered the same in both ferrules produced from cutting the double ferrule 78. Further, the individual ferrules produced by cutting the double ferrule 78 can be connectorized, if desired, such as with MTP connectors when the double ferrule 78 is a MTP type double ferrule. If another type of ferrule is used, other compatible connector types can be provided.

Figure 6:
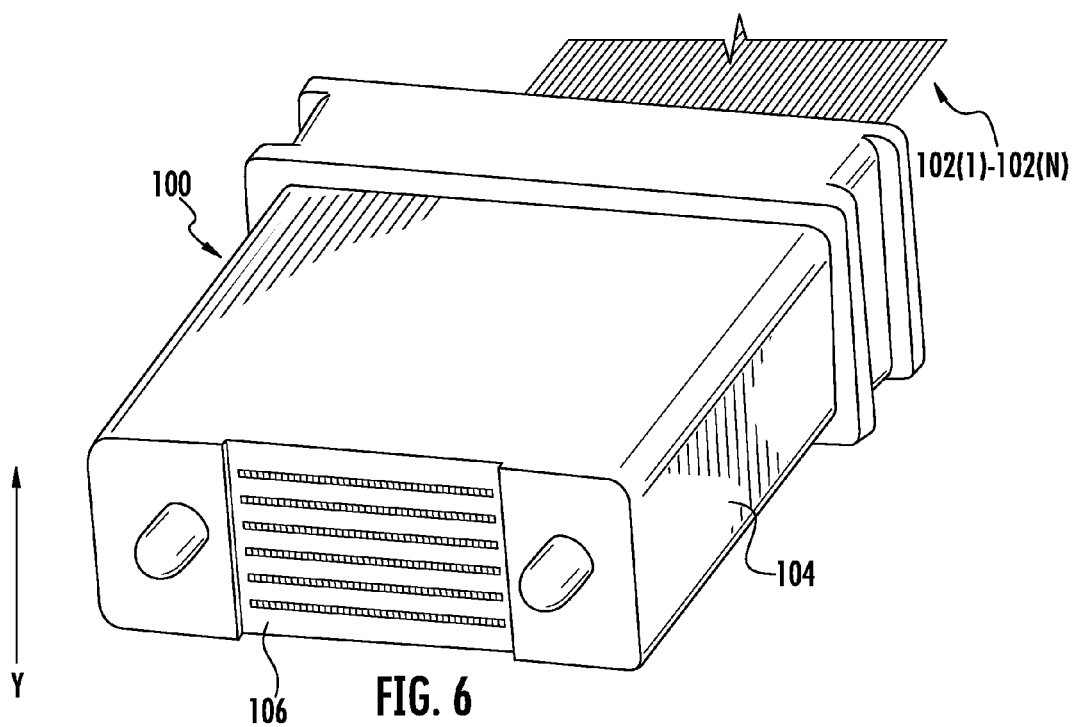
FIG. 6 illustrates perspective view of a fully assembled, MTP connectorized end exposing stacked ribbons from a multi-ribbon fiber optic cable resulting from method(s) of reducing and/or avoiding fiber ordering during preparations of MTP connectorized ends for multi-ribbon, fiber optic cables in a multi-ribbon cable system.

For example, FIG. 6 illustrates a perspective view of a fully assembled, MTP connectorized end 100 of ribbons 102(1)-102(N) from a fiber optic cable prepared according to methods disclosed herein. In this example, a ferrule 104 that resulted from cutting a double ferrule according to the methods and embodiments disclosed herein allowed for stacking of the ribbons 102(1)-102(N) in a specific order, which are shown in an end face 106 of the ferrule 104. In this example, the ferrule 104 is internally configured to allow assignment of a particular ribbon 102(1)-102(N) to a particular vertical position in the Y-direction, as illustrated in FIG. 6. However, the particular ordering of the ribbons 102(1)-102(N) into particular vertical positions is not required according to the methods and embodiments disclosed herein. Because the ribbons 102(1)-102(N) will have been assigned into vertical positions consistently in the double ferrule from which the ferrule 104 resulted before being cut, the ribbons 102(1)-102(N) will have been assigned into vertical positions consistently between an adjacent ferrule to the ferrule 104, thus maintaining the same fiber ordering.

Figure 7A:
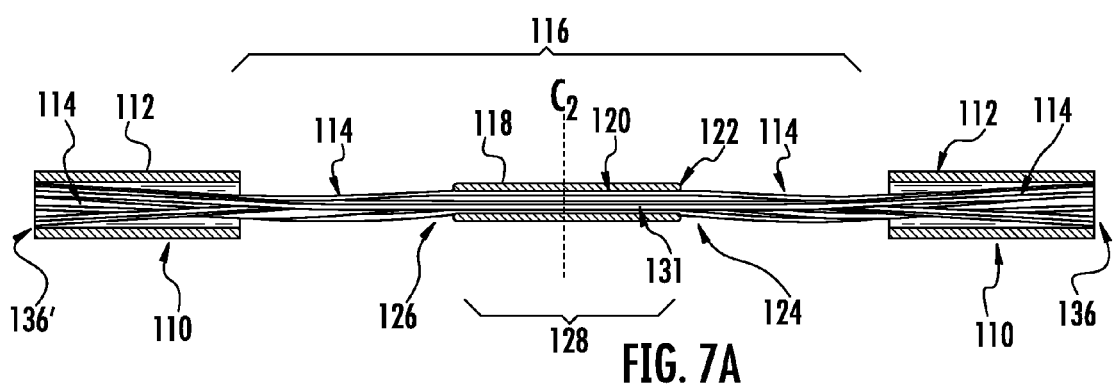
FIGS. 7A-7C illustrate exemplary preparations to a multi-fiber, fiber optic cable for reducing and/or avoiding fiber ordering to prepare LC-style connectorized ends for multi-fiber, fiber optic cables in a multi-fiber cable system.
Figure 7B:
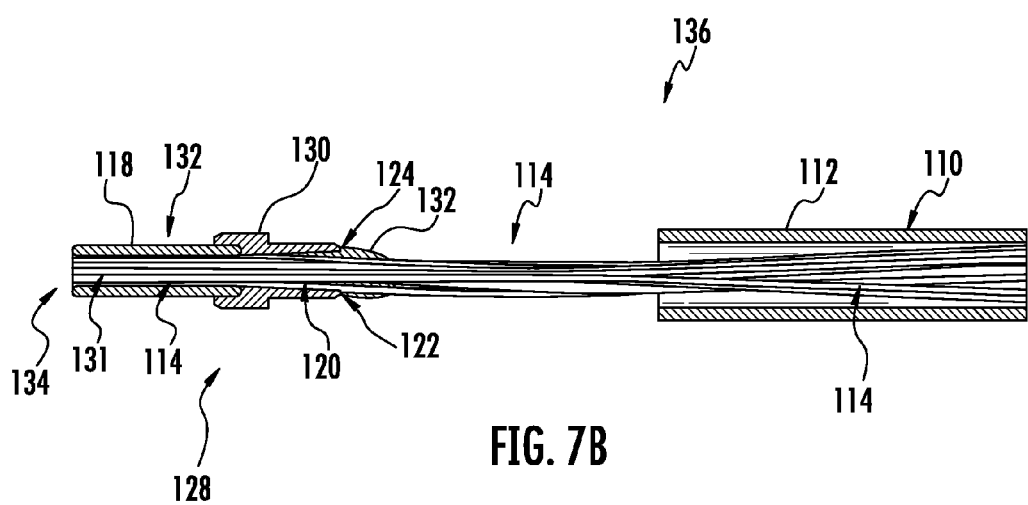
Figure 7C:
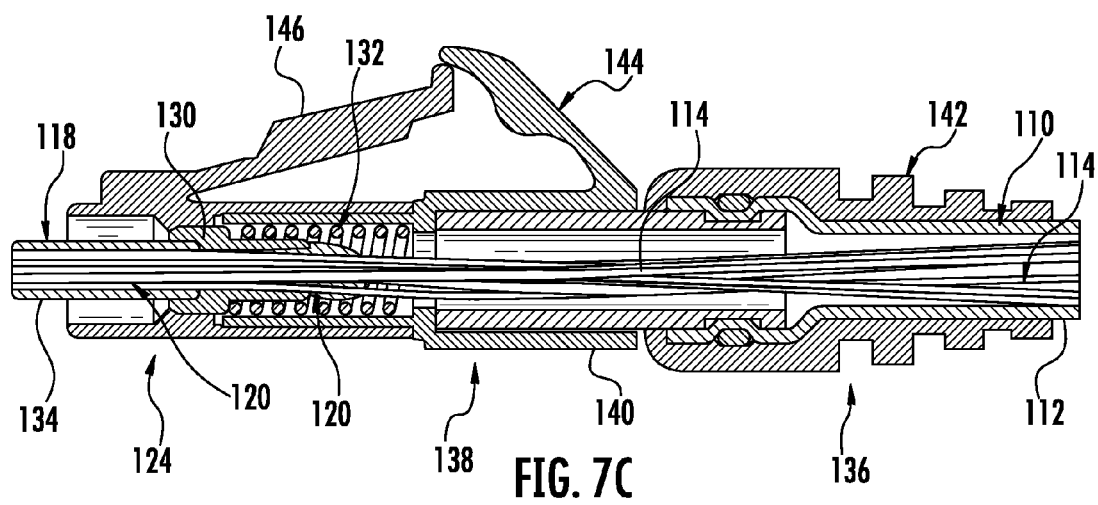

The methods of reducing and/or avoiding fiber ordering during preparations of a multi-fiber, fiber optic cable to provide a connectorized multi-fiber, fiber optic cable system can also be provided with different types of fiber optic ferrules other than the MTP style ferrules disclosed above. For example, FIGS. 7A-7C illustrate exemplary preparations to a multi-fiber, fiber optic cable 110 for reducing and/or avoiding fiber ordering to prepare LC-style connectorized ends for multi-fiber, fiber optic cables in a multi-fiber cable system. For example, an LC-style ferrule type may be used to produce a fiber optic cable system like the fiber optic cable system 60 in FIG. 4 as an example, except that LC-style connectors will be disposed on the fiber optic cable ends instead of MTP connectors.

FIG. 7A illustrates the multi-fiber, fiber optic cable 110. The multi-fiber, fiber optic cable may be a high-density fiber optic cable that includes a larger number of optical fibers to support high data rate transfers. The fiber optic cable 110 may include an outer cable jacket 112 to protect optical fibers 114 disposed within the fiber optic cable 110. The fiber optic cable 110 is provided at the desired length for the entire length of the fiber optic cable system to be prepared and manufactured. A section 116 of the fiber optic cable 110 is windowed to exposed the optical fibers 114 disposed in the fiber optic cable 110, as illustrated in FIG. 7A. For example, windowing may involve stripping away the outer cable jacket 112 from the fiber optic cable 110 to expose the optical fibers 114 disposed in the fiber optic cable 110. A stripping tool or other tool may be employed to strip away the outer cable jacket 112.

After windowing of the section 116 of the fiber optic cable 110 to the expose the optical fibers 114, the optical fibers 114 in this example are placed in an LC-style double ferrule 118 (or "double ferrule 118") as also illustrated in FIG. 7A. FIG. 7A illustrates a side view of the double ferrule 118. FIG. 7B illustrates a top view of the double ferrule 118. At least a portion of the exposed optical fibers 114 from the windowed section 116 of the fiber optic cable 110 are disposed in at least one channel 120 in an interior space 122 of the double ferrule 118. The exposed optical fibers 114 are exposed through both a first end 124 and a second end 126 of the double ferrule 118 to form a double ferrule assembly 128. The double ferrule 118 in the double ferrule assembly 128 provides a structure that can be cut to provide two opposing ferrules that can be connectorized to provide compatible adjacent fiber optic connectors as part of the fiber optic cable assembly.

At this point, the natural fiber ordering of the exposed optical fibers 114 in the interior space 122 of the double ferrule 118 can be fixed to ensure that the fiber ordering does not change as further preparations are made. A "natural fiber ordering" means the fiber ordering that exists as a result of the arrangement of the optical fibers 114 inside the fiber optic cable 110 and as altered when the optical fibers 114 move or translate as the section 116 is windowed and the optical fibers 114 exposed and disposed in the double ferrule 118. In this regard, as illustrated in FIG. 7B, the first end 124 and the second end (not shown in FIG. 7B) of the double ferrule 118 are sealed with a collar 130. A potting material 131 is used to fix the fiber ordering, as it exists up through this point in preparations, of the exposed optical fibers 114 disposed in the interior space 122 of the double ferrule 118. The double ferrule assembly 128 may then be cured in an oven or through other heat source to solidify the potting material 131 in the interior space 122 of the double ferrule 118 to fix the fiber ordering of the optical fibers 114. For example, the double ferrule assembly 128 may be cured at temperatures between 20 degrees Celsius and 300 degrees Celsius and/or for a period of time such as up to two (2) minutes, as non-limiting examples. Thus, when the double ferrule 118 is cut to form two separate ferrules from the double ferrule 118, the fiber order of the optical fibers 114 will be the same between both ferrules without the fiber order having to be assigned.

In this regard, FIG. 7B illustrates a portion of the double ferrule assembly 128 after the double ferrule 118 has been cut between the first end 124 and the second end 126. In this embodiment, the double ferrule 118 is cut in half at center line $C_2$ (FIG. 7A) to provide a first ferrule 132 having a first end face 134 and a second ferrule (not shown) having a second end face. The cutting of the double ferrule 118 also provides two fiber optic cables 136, 136'. For example, the double ferrule 118 may be cut using at least one of a laser, a diamond blade, and an abrasive wire. The first ferrule 132 is provided as part of the fiber optic cable 136, and a second ferrule is provided as part of the fiber optic cable 136'. The optical fibers 114 are disposed through the first end face 134 of the first ferrule 132 and through the end face of the second ferrule such that the exposed optical fibers 114 have the same fiber ordering. This is because the fiber ordering was filed at the center line $C_2$ when the potting material was discussed in the interior space 122 of the double ferrule 118. Thus, the first ferrule 132 and a second ferrule produced from cutting the double ferrule 118 are compatible, meaning they contain exposed optical fibers 114 having the same fiber ordering without the fiber ordering having to have been assigned or selected.

FIG. 7C illustrates the fiber optic cables 136 after the first ferrule 132 has been connectorized, which in this example is an LC-style fiber optic connector 138. The LC-style fiber optic connector 138 has features normally present in LC-style fiber optic connectors, including a connector housing 140, a fiber optic cable boot 142, and a trigger 144 configured to activate a latch 146 for removing the LC-style fiber optic connector 138 from an adapter or another connector.

The optical fibers from a fiber optic cable may be disposed in a ferrule in a number of manners and methods, including with different processes and using different materials. These manners and methods may include techniques to maximize the interior space inside a ferrule for maximum disposition of optical ferrules therein. These ferrules may include certain packaging or geometric features to assist in retaining optical fibers in an interior space of the ferrule. In this regard, FIG. 8 illustrates an exemplary method and fiber optic ferrule for supporting optical fibers resulting from preparations to a multi-fiber, fiber optic cable for reducing and/or avoiding fiber ordering to prepare connectorized ends for multi-fiber, fiber optic cables in a multi-fiber cable system. As illustrated in FIG. 8, a U-shaped ferrule 150 is provided that may be used as a ferrule for preparations of a multi-fiber, fiber optic cable to reduce and/or avoid fiber ordering to prepare a fiber optic cable system. The U-shaped ferrule 150 in FIG. 8 is a custom U-shaped ferrule in this embodiment, and formed using injection molded plastic, or stamped metal as examples.

With continuing reference to FIG. 8, optical fibers 154 are arranged in a stacked fashion inside an interior space 156 formed inside the U-shaped ferrule 150. The stacked optical fibers 154 may be provided in individual ribbons that are stacked on top of each other, or may be provided as individual fibers that are arranged and/or stacked inside the interior space 156 of the U-shaped ferrule 150. Just as previously discussed, a potting material 158 is disposed inside the interior space 156 and surrounds an interstitial space 157 between the optical fibers 154 to fix the optical fiber 154 in place to provide for a fixed fiber ordering prior to cutting of the U-shaped ferrule 150. For example, the U-shaped ferrule 150 may be cut using at least one of a laser, a diamond blade, and an abrasive wire.

With continuing reference to FIG. 8, the U-shaped ferrule 150 may include an exterior surface 152 that is smooth in this embodiment. The exterior surface 152 of the U-shaped ferrule 150 may be dimensionally uniform along the length of the U-shaped ferrule 150 prior to cutting. In order to use the U-shaped ferrule 150 to prepare a fiber optic cable system according to the embodiments disclosed herein, a custom fiber optic connector may need to be created and/or modified to accommodate the variances in optical fiber shape of the arrangement of the optical fibers 154 disposed in the interior space 156 of the U-shaped ferrule 150 and fixed therein after potting. In this example, it may be useful to ensure that the fiber optic connector assembly employed to connectorize the U-shaped ferrule 150 only applies force to exterior surfaces 152 of the U-shaped ferrule 150 wherein dimensional control is well maintained, such as a bottom 160 and sides 162A, 162B of the U-shaped ferrule 150. Providing a custom ferrule design, such as the U-shaped ferrule 150, could be used to ensure that standard fiber optic connector types, such as LC-style or MTP type connectors for example, will not mistakenly be used in a fiber optic cable system created from the custom ferrule.

Figure 9B:
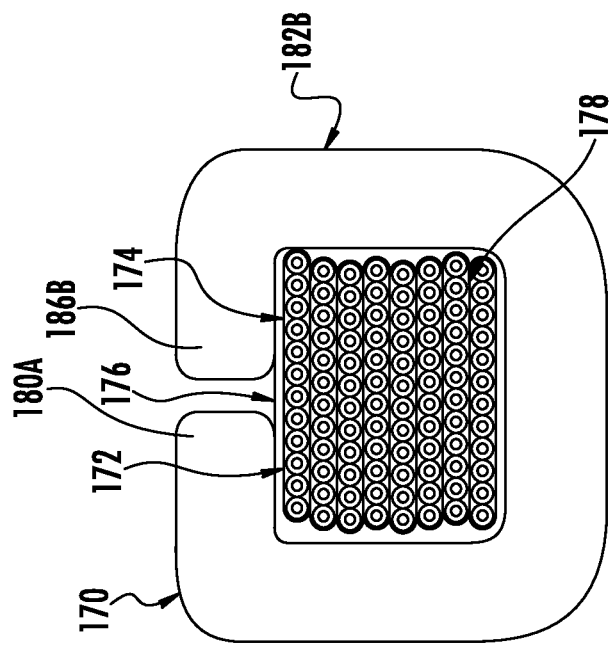
FIGS. 9A and 9B illustrates another exemplary method and fiber optic ferrule for supporting optical fibers resulting from preparations to a multi-fiber, fiber optic cable for reducing and/or avoiding fiber ordering to prepare connectorized ends for multi-fiber, fiber optic cables in a multi-fiber cable system.
Figure 9A:
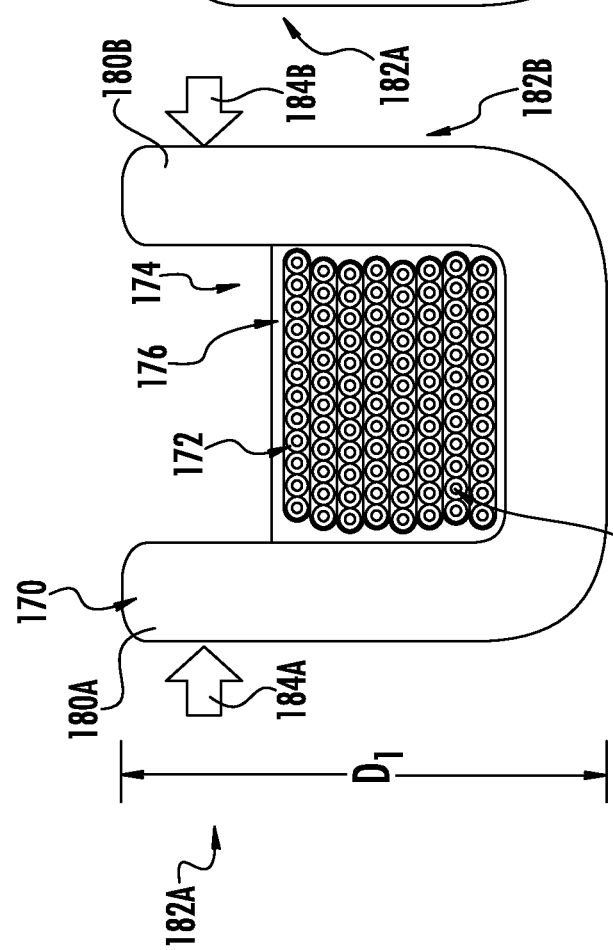

In an alternative configuration, the depth of a U-shaped ferrule may be increased to provide deformable tabs extending above the region where optical fibers are disposed inside the ferrule. This allows the deformable tabs to be folded back onto the ferrule to provide an enclosure to protect the optical fibers disposed inside the ferrule. In this regard, FIGS. 9A and 9B illustrate such an alternative U-shaped ferrule 170. The U-shaped ferrule 170 can be used to support optical fibers resulting from preparations to a multi-fiber, fiber optic cable for reducing and/or avoiding fiber ordering to prepare connectorized ends for multi-fiber, fiber optic cables in a multi-fiber cable system.

With continuing reference to FIGS. 9A and 9B, optical fibers 172 are arranged in a stacked fashion inside an interior space 174 inside the U-shaped ferrule 170. The optical fibers 172 may contain ribbons of optical fibers or individual optical fibers that are stacked inside the interior space 174 of the U-shaped ferrule 170. Just as previously discussed, a potting material 176 is disposed inside the interior space 174 and surrounds an interstitial space 178 between the optical fibers 172 to fix the optical fiber 172 in place to provide for providing a fixed fiber ordering prior to cutting of the U-shaped ferrule 170. For example, the U-shaped ferrule 170 may be cut using at least one of a laser, a diamond blade, and an abrasive wire.

The U-shaped ferrule 170 in FIGS. 9A and 9B is similar to the U-shaped ferrule 150 in FIG. 8. However in the U-shaped ferrule 170, as illustrated in FIG. 9A, a depth $D_1$ of the U-shaped ferrule 170 may be extended so that deformable tabs 180A, 180B are provided on each side 182A, 182B of the U-shaped ferrule 170. The deformable tabs 180A, 180B are configured to be pushed inward towards the interior space 174, as shown by arrows 184A, 184B in FIG. 9A before or after the optical fibers 172 are potted inside the interior space 174 of the U-shaped ferrule 170. In this manner, as illustrated in FIG. 9B, the U-shaped ferrule 170 completely or almost complete surrounds the optical fibers 172 disposed in the interior space 174 of the U-shaped ferrule 170.

Figure 10A:
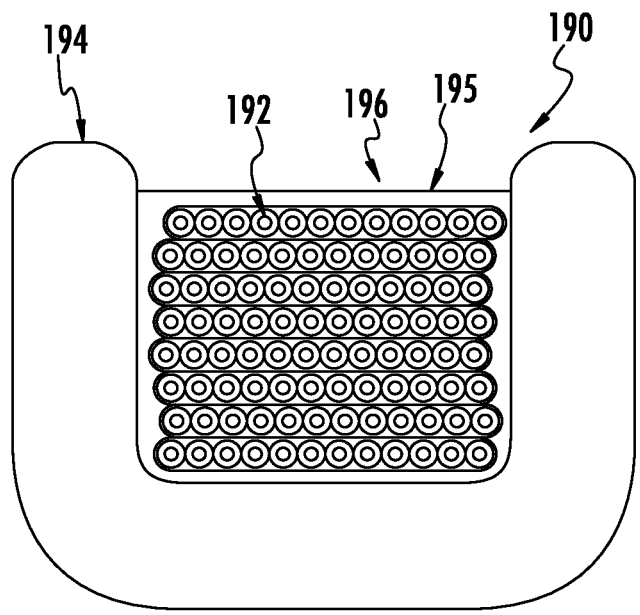
FIGS. 10A and 10B illustrate another exemplary method of forming a fiber optic ferrule for supporting optical fibers resulting from preparations to a multi-fiber, fiber optic cable for reducing and/or avoiding fiber ordering to prepare connectorized ends for multi-fiber, fiber optic cables in a multi-fiber cable system.
Figure 10B:
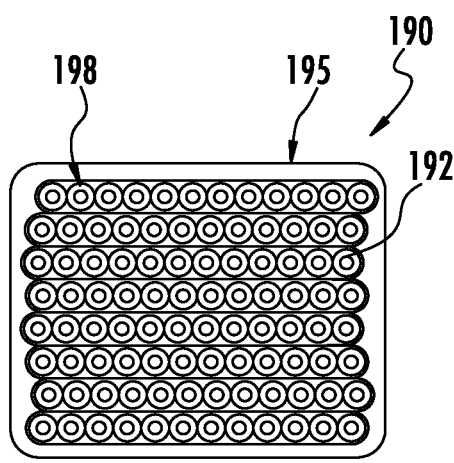

A mold may be used to form a ferrule used to prepare fiber optic cable systems using the methods disclosed herein, the ferrule may also be formed using molded potting material as another example. In this regard, FIGS. 10A and 10B illustrate another exemplary ferrule 190 for supporting optical fibers 192 resulting from preparations to a multi-fiber, fiber optic cable for reducing and/or avoiding fiber ordering to prepare connectorized ends for multi-fiber, fiber optic cables in a multi-fiber cable system. In this example as illustrated in FIG. 10A, a mold 194 is provided that has a similar form to the U-shaped ferrules 150 or 170 in FIG. 8 and FIGS. 9A and 9B, respectively. The mold 194 may be provided to assist in forming the ferrule 190, as illustrated in FIG. 10B. For example, a ferrule from the mold may enable a low cost fabrication of connectors and connectorization of fiber optic cables in a fiber optic cable system provided according to the embodiments and methods disclosed herein.

With continuing reference to FIGS. 10A and 10B, the mold 194 is used to pot the optical fibers 192 to provide the ferrule 190, as illustrated in FIG. 10B. The mold 194 maybe constructed from a potting material. A separate potting material 195 is disposed inside an interior space 196 in the mold 194 to fix the optical fibers 192 together and in a fixed ordering before cutting, as illustrated in FIG. 10A. After the potting material 195 has solidified, such as after a curing process as an example, the mold 194 can be removed, as illustrated in FIG. 10B. The ferrule 190 will then consist of the potted optical fibers 198 after potting without the retention of the mold 194. The ferrule 190 can then be cut to form compatible ferrules having the same fiber ordering as part of a fiber optic cable system.

Figure 11A:
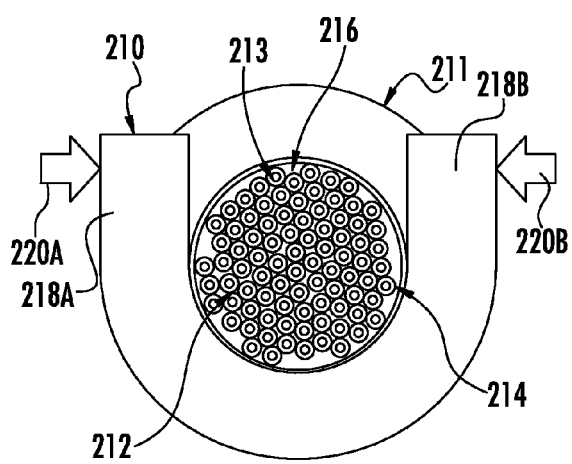
FIGS. 11A and 11B illustrates another exemplary method and fiber optic ferrule for supporting optical fibers resulting from preparations to a multi-fiber, fiber optic cable for reducing and/or avoiding fiber ordering to prepare connectorized ends for multi-fiber, fiber optic cables in a multi-fiber cable system.
Figure 11B:
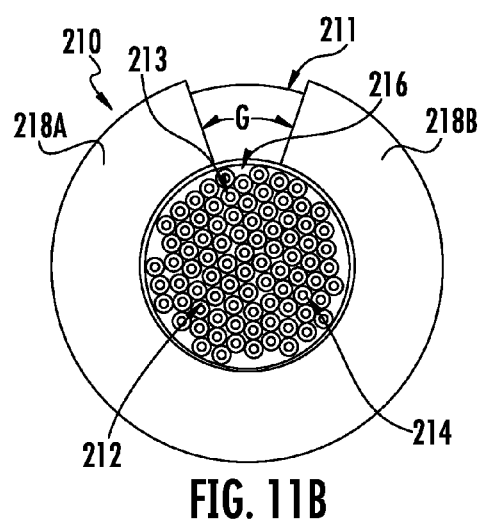

While certain embodiments disclosed herein, such as FIGS. 8-10B, disclose the preparation of a ferrule with arrays or ribbons of optical fibers, a similar approach may be followed using a large number of individual optical fibers. In this regard, FIGS. 11A and 11B illustrate another exemplary fiber optic ferrule for supporting optical fibers resulting from preparations to a multi-fiber, fiber optic cable for reducing and/or avoiding fiber ordering to prepare connectorized ends for multi-fiber, fiber optic cables in a multi-fiber cable system. With reference to FIG. 11A, a U-shaped ferrule 210 is provided and disposed in front of a fiber optic cable jacket 211. Individual optical fibers 212 are disposed in fiber clusters 213 inside an interior space 214 of the U-shaped ferrule 210. A potting material 216 can be disposed in the interior space 214 to fix the optical fibers 212 and fix the fiber ordering inside the interior space 214. As illustrated in FIG. 11A, the U-shaped ferrule 210 contains two deformable tabs 218A, 218A that can be deformed towards each other rotationally in the directions of arrows 220A, 220B towards the interior space 214 of the U-shaped ferrule 210 either before or after the potting material 216 is disposed in the interior space 214 of the U-shaped ferrule 210. As illustrated in FIG. 11B, a gap G remains between the two deformable tabs 218A, 218B. The gap G provides a feature in the U-shaped ferrule 210 that, for example, could be used to provide rotation alignment of the U-shaped ferrule 210 in a connector assembly when the U-shaped ferrule 210 is connectorized. Alternatively, the gap G could provide a precision slot that is sawed into the U-shaped ferrule 210 prior to the formation of the U-shaped ferrule 210, so that the position and dimensions of the gap G are used to ensure rotation alignment during the connectorization process.

Alternatively or optionally, the optical fibers disposed in a ferrule could be forced or packed down in an interior space of the ferrule using a press and/or vibration to control the disposition or ordering of the optical fibers to micro-precision, to reduce the interstitial space between optical fibers, and/or allow more optical fibers to be provided in a given ferrule. These features could be provided with any of the ferrule embodiments disclosed herein. In this regard, FIGS. 12A-12C illustrate a fiber optic ferrule 230 for supporting optical fibers resulting from preparations to a multi-fiber, fiber optic cable for reducing and/or avoiding fiber ordering to prepare connectorized ends for multi-fiber, fiber optic cables in a multi-fiber cable system. The ferrule 230 in this embodiment includes an interior space 232 that is configured to receive optical fibers 234, as illustrated in FIG. 12A. A press 236 is provided that will be used to force the optical fibers 234 down into the interior space 232 of the ferrule 230 towards a bottom surface 238 of the ferrule 230.

With reference to FIG. 12B, the press 236 is activated to press the optical fibers 234 disposed in the interior space 232 towards the bottom surface 238 of the ferrule 230, either prior to or after a potting material 240 is disposed in the interior space 232 of the ferrule 230. The optical fibers 234 will self-align to a regular array in response so that the center locations in each optical fiber 234 are established to be within small distances to each other, such as within few micrometers of each other, after the press 236 is withdrawn, as illustrated in FIG. 12C. The alignment of the optical fibers 234 will be fixed, thereby fixing the fiber ordering, when the potting material 240 solidifies, such as through a curing process as an example. The ferrule 230 may also be vibrated in lieu of or in addition to employing the press 236, including in a lateral motion, as indicated by arrows 242 in FIGS. 12A and 12B as an example, to further reduce the interstitial space between the optical fibers 234 disposed in the interior space 232 of the ferrule 230 to cause the optical fibers 234 to self-align, as discussed above.

Alternatively, similar to the ferrule 190 in FIGS. 10A and 10B, a ferrule in FIGS. 13A and 13B may be provided as the result of using a mold 250. The mold 250 will be removed after the potting material 240 is applied to the optical fibers 234 disposed in the mold 250. The mold 250 can then be removed to produce a ferrule 252 as the optical fibers 234 are secured by the potting material 240. The features discussed with respect to any of the embodiments discussed above, including but not limited to pressing, vibration, packing, and potting, may be applied to the mold 250 to self-align the optical fibers 234 disposed there before the mold 250 is removed to form the ferrule 252. Also as discussed above for FIGS. 10A and 10B, producing a ferrule from a mold may enable a low cost fabrication of connectors.

As used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163, the disclosures of which are incorporated herein by reference in their entireties.

Many modifications and other embodiments of the embodiments set forth herein will come to mind to one skilled in the art to which the embodiments pertain having the benefit of the teachings presented in the foregoing descriptions and the associated drawings. For example, the ferrules disclosed herein can also include optional ports for injecting the potting material or material into an interior space of the ferrules. Ferrules can be produced from molds that are removed, leaving only potted optical fibers or fiber arrays, which may be beneficial for low mate/demate frequency applications as one non-limiting example. Alternatively, slots or other external features can be provided to aid in mechanical interconnection or latching of the ferrules. These slots can be used to engage other components within the same connector for the U-shaped ferrule, such as a collar component or to engage mechanical mating features within an alignment channel to retain a connector in place to the ferrule. Integrating these mechanical interconnections or latching features within the body of the ferrule may enable simplified and/or low cost connectors for connectorizing the fiber optic cable systems prepared using the methods disclosed herein.

While the fiber array or individual optical fiber arrangements disclosed herein are not required to be specifically assigned or ordered, the optical fibers disposed within any of the ferrules disclosed herein could be specifically assigned, if desired, during the preparations and methods disclosed herein. This approach would allow replacement of at least one side of a mass fiber array connection, either at the source, at an intermediate jumper cable, or at the detector, without requiring replacement of the entire length of a fiber optic cable system. However, even if the optical fibers are not specifically ordered, the mapping of optical fibers could be detected by a detector by electronic mapping or remapping. One example of mapping of optical fibers in a fiber optic cable system that may be employed to map optical fibers in the fiber optic cable systems disclosed herein is disclosed in U.S. Pat. No. 7,623,793 entitled "System and Method of Configuring Fiber Optic Communication Channels Between Arrays of Emittters and Detectors," which is incorporated herein by reference in its entirety.

Though the connectors and adapters provided herein are fiber optic connectors and adapters, other types may be provided, including but not limited to FC, SC, ST, LC, MTP and MPO, as examples. The terms "connector" and "adapter" are not limited. A "connector" can be provided in any form or package desired that is capable of providing a connection to allow one or more communications lines to be communicatively connected or coupled to other communications lines disposed in another adapter or connector in which the connector is attached.

Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A method of preparing connectorized ends in a multi-fiber, fiber optic cable to provide a multi-fiber, fiber optic cable system, comprising: providing a multi-fiber, fiber optic cable at a length; windowing a section of the multi-fiber, fiber optic cable at a first access point to expose optical fibers disposed in the multi-fiber, fiber optic cable; placing at least a portion of the exposed optical fibers from the windowed section of the multi-fiber, fiber optic cable into at least one channel in an interior space of a double ferrule having a first end and a second end, the optical fibers exposed through both the first end and the second end of the double ferrule to form a double ferrule assembly; fixing an ordering of the optical fiber disposed in the double ferrule assembly in a fixed ordering; and cutting the double ferrule assembly between the first end of the double ferrule and the second end of the double ferrule to provide a first ferrule having a first end face and a second ferrule having a second end face, wherein the optical fibers disposed through the first end face and the optical fibers disposed through the second end face both have the fixed ordering, wherein the double ferrule further comprises a first tab extending in a first plane along a longitudinal axis of the double ferrule and a second tab extending in a second plane parallel to the first plane along the longitudinal axis of the double ferrule, further comprising folding the first tab and the second tab into the interior space of the double ferrule after the fixing the order of the optical fibers.

2. The method of claim 1, wherein providing the multi-fiber, fiber optic cable at a length comprises cutting the multi-fiber, fiber optic cable at the length.

3. The method of claim 1, wherein the windowing the section of the multi-fiber, fiber optic cable comprises removing a portion of a cable jacket of the multi-fiber, fiber optic cable at the first access point to expose the optical fibers disposed in the multi-fiber, fiber optic cable.

4. The method of claim 1, further comprising removing a coating from the exposed optical fibers after the windowing of the section of the multi-fiber, fiber optic cable.

5. The method of claim 1, further comprising sealing the optical fibers exposed through the first end and the second end of the double ferrule.

6. The method of claim 1, wherein the multi-fiber, fiber optic cable is comprised of a plurality of ribbons each containing a plurality of optical fibers.

7. The method of claim 6, wherein the placing further comprises placing the at least a portion of the exposed optical fibers from the plurality of ribbons from the windowed section of the multi-fiber, fiber optic cable into channels forming the interior space in the double ferrule.

8. The method of claim 6, wherein the placing further comprises stacking the plurality of ribbons on each other in the at least one channel of the double ferrule.

9. The method of claim 1, wherein the fixing further comprises potting the at least a portion of the exposed optical fibers disposed in the double ferrule assembly to form the fixed ordering of the optical fibers.

10. The method of claim 9, further comprising curing the double ferrule assembly after the potting.

11. The method of claim 1, further comprising disposing the first ferrule into a first connector assembly, and disposing the second ferrule into a second connector assembly.

12. The method of claim 1, further comprising disposing the first ferrule into a first multi-fiber termination push-on (MTP) connector assembly and disposing the second ferrule into a second MTP connector assembly.

13. The method of claim 1, further comprising securing a first collar structure to the first ferrule and securing a second collar structure to the second ferrule.

14. The method of claim 1, further comprising forming the double ferrule by potting the optical fibers in a mold, curing the potting, and removing the mold.

15. The method of claim 1, further comprising vibrating the double ferrule after the placing the at least a portion of the exposed optical fibers from the windowed section of the multi-fiber, fiber optic cable into at least one channel in the interior space of the double ferrule.

16. The method of claim 1, further comprising pressing the at least a portion of the exposed optical fibers from the windowed section of the multi-fiber, fiber optic cable placed into at least one channel in the interior space of the double ferrule.

17. The method of claim 1, wherein the double ferrule is comprised of a monolithic double ferrule.

18. The method of claim 1, wherein the optical fibers are comprised of optical fibers having an outer diameter between 70-100 micrometers (μm).

19. The method of claim 1, wherein the optical fibers are comprised of two hundred (200) or more optical fibers.

20. The method of claim 1, wherein the optical fibers are comprised of two hundred (200) or more optical fibers, wherein each of the optical fibers has an outer diameter between 70-100 micrometers (μm), and the multi-fiber, fiber optic cable has an outer diameter less than 5.1 millimeters (mm).

* * * * *